US010173407B2

(12) United States Patent
Tsai et al.

(10) Patent No.: US 10,173,407 B2
(45) Date of Patent: Jan. 8, 2019

(54) DEVICE FOR REMOVING AND ADHERING SUBSTRATE AND METHOD FOR USING THE DEVICE

(71) Applicant: Industrial Technology Research Institute, Hsinchu (TW)

(72) Inventors: Chen-Chu Tsai, Taichung (TW); Cheng-Yi Wang, Hsinchu County (TW); Shi-Chang Chen, Hualien County (TW); Tzu-Chun Lin, Changhua County (TW)

(73) Assignee: INDUSTRIAL TECHNOLOGY RESEARCH INSTITUTE, Chu-Tung (TW)

( * ) Notice: Subject to any disclaimer, the term of this patent is extended or adjusted under 35 U.S.C. 154(b) by 0 days.

(21) Appl. No.: 15/135,403

(22) Filed: Apr. 21, 2016

(65) Prior Publication Data

US 2017/0144422 A1    May 25, 2017

Related U.S. Application Data

(60) Provisional application No. 62/258,295, filed on Nov. 20, 2015.

(30) Foreign Application Priority Data

Dec. 23, 2015  (TW) .............................. 104143269 A

(51) Int. Cl.
 *B32B 37/10* (2006.01)
 *B32B 37/00* (2006.01)
 *B32B 43/00* (2006.01)

(52) U.S. Cl.
 CPC ...... *B32B 37/1018* (2013.01); *B32B 37/0046* (2013.01); *B32B 43/006* (2013.01); *B32B 2457/00* (2013.01)

(58) Field of Classification Search
 CPC ............ B32B 37/1018; B32B 37/0046; B32B 2457/00
 (Continued)

(56) References Cited

U.S. PATENT DOCUMENTS 5,108,532 A * 4/1992 Thein .................... B29C 43/203
 156/285
5,582,673 A * 12/1996 Burack ............ B29D 11/00663
 156/285

(Continued)

FOREIGN PATENT DOCUMENTS

CN  1409374     4/2003
CN  103177998 A  6/2013
(Continued)

OTHER PUBLICATIONS

Yokota Michiya, Split separation method and separation device, CN 104143499.*

(Continued)

*Primary Examiner* — Michael N Orlando
*Assistant Examiner* — Christian Roldan
(74) *Attorney, Agent, or Firm* — Nixon Peabody LLP

(57) ABSTRACT

A device is for removing a first substrate from a second substrate or adhering the first substrate to the second substrate. The device includes a carrier, a flexible member and a supporting member. The carrier is for fixing the first substrate. The flexible member is for fixing the second substrate. The supporting member is connected to the carrier and the flexible member. The carrier and the flexible member are spaced a distance from each other. The carrier, the flexible member and the supporting member together define a first variable pressure chamber. The first variable pressure chamber has a first air hole.

14 Claims, 13 Drawing Sheets

(58) Field of Classification Search
USPC .......................................................... 156/285
See application file for complete search history.

(56) References Cited

U.S. PATENT DOCUMENTS

| | | | |
|---|---|---|---|
| 7,229,900 B2 | 6/2007 | Takayama | |
| 7,435,311 B1* | 10/2008 | Marzen | B32B 37/003 156/285 |
| 7,858,411 B2 | 12/2010 | Yamazaki | |
| 8,376,017 B2 | 2/2013 | Lee | |
| 9,805,953 B2* | 10/2017 | Ohno | H01L 21/6838 |
| 2003/0047280 A1* | 3/2003 | Takayama | B32B 7/06 156/708 |
| 2003/0178133 A1* | 9/2003 | Lee | B32B 37/10 156/285 |
| 2006/0199382 A1 | 9/2006 | Sugiyama | |
| 2007/0125495 A1* | 6/2007 | Nakamura | B32B 38/1841 156/382 |
| 2008/0113486 A1* | 5/2008 | Eguchi | B32B 43/006 438/458 |
| 2009/0126872 A1* | 5/2009 | Sampica | B32B 17/10018 156/382 |
| 2011/0048611 A1 | 3/2011 | Carre | |
| 2013/0000816 A1* | 1/2013 | Van Den Brand | B32B 37/0046 156/64 |
| 2013/0011969 A1 | 1/2013 | Chen | |
| 2013/0118692 A1 | 5/2013 | Miki | |
| 2014/0020847 A1* | 1/2014 | Burggraf | H01L 21/67092 156/714 |
| 2014/0076500 A1* | 3/2014 | Honda | H01L 21/67092 156/750 |
| 2015/0060869 A1 | 3/2015 | Ro | |
| 2015/0202849 A1* | 7/2015 | Yu | B32B 37/0046 156/580 |

FOREIGN PATENT DOCUMENTS

| | | |
|---|---|---|
| CN | 103681733 A | 3/2014 |
| CN | 103802441 A | 5/2014 |
| CN | 104143499 A | 11/2014 |
| CN | 104483732 A | 4/2015 |
| CN | 104765168 A | 7/2015 |
| CN | 204884440 U | 12/2015 |
| JP | 2000-349136 A | 12/2000 |
| JP | 2001344735 A | 12/2001 |
| TW | 508690 B | 11/2002 |
| TW | 531826 B | 5/2003 |
| TW | 200712607 A | 4/2007 |
| TW | M329047 | 3/2008 |
| TW | 201213100 A | 4/2012 |
| TW | 1381495 B | 1/2013 |
| TW | 201301972 A | 1/2013 |
| TW | I394722 | 5/2013 |
| TW | 201408488 A | 3/2014 |
| TW | 201418031 | 5/2014 |
| TW | I436702 B | 5/2014 |
| TW | 201434649 | 9/2014 |
| TW | 201446526 | 12/2014 |
| TW | 201522067 | 6/2015 |
| TW | I487017 B | 6/2015 |
| TW | M506987 | 8/2015 |

OTHER PUBLICATIONS

Liu, Mei-Zhen, Structure for roller-driven peeling device of negative pressure web boxes, TW M506987.*
Office Action for Taiwanese Patent Application No. TW104143269, dated Feb. 3, 2017, in Chinese (10 pages).
Foreign Office Action dated May 28, 2018 from Application No. 201610081463.4.

* cited by examiner

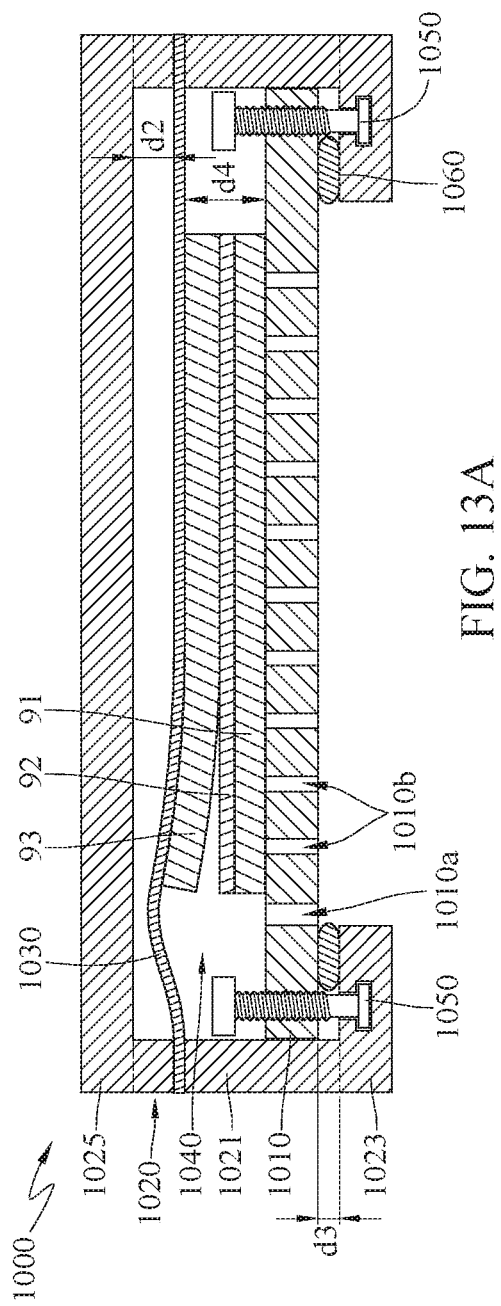
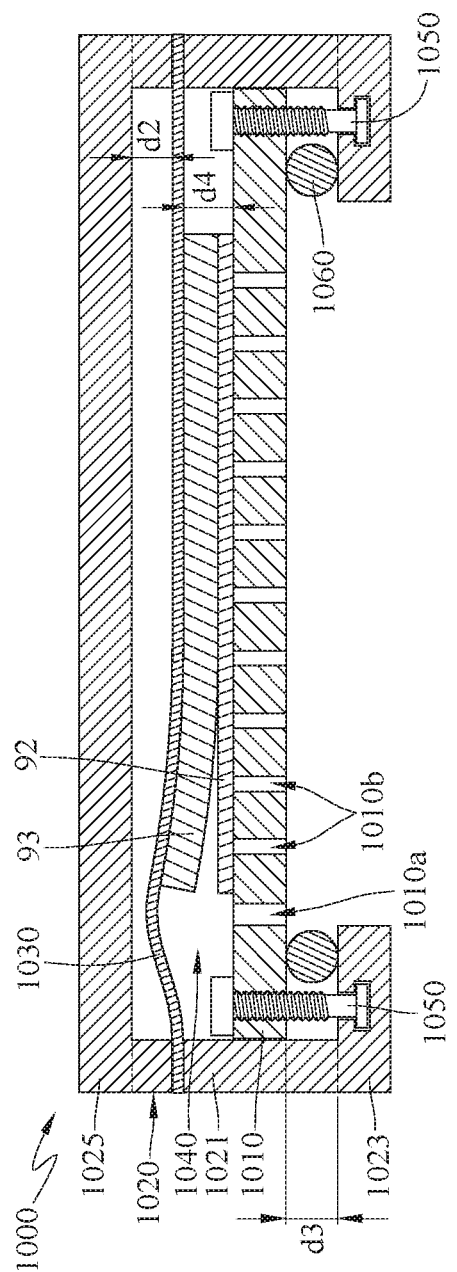

DEVICE FOR REMOVING AND ADHERING SUBSTRATE AND METHOD FOR USING THE DEVICE

CROSS-REFERENCE TO RELATED APPLICATIONS

This non-provisional application claims the priority benefits of U.S. provisional application Ser. No. 62/258,295, filed on Nov. 20, 2015 and Taiwan application serial no. 104143269, filed on Dec. 23, 2015. The entirety of each of the above-mentioned patent applications is hereby incorporated by reference herein.

TECHNICAL FIELD

The disclosure relates to a device for removing and adhering substrate and a method for using the device.

BACKGROUND

In flexible electronic device industry, flexible electronic devices can produce by sheet to sheet process. After forming the flexible electronic devices, the flexible electronic devices need to be removed from support substrate. In addition, protection film or function film may need to be adhered to the flexible electronic device.

SUMMARY

One embodiment of the disclosure provides a device for removing a first substrate from a second substrate or adhering the first substrate to the second substrate. The device includes a carrier, a flexible member and a supporting member. The carrier is for fixing the first substrate. The flexible member is for fixing the second substrate. The supporting member is connected to the carrier and the flexible member. The carrier and the flexible member are spaced a distance from each other. The carrier, the flexible member and the supporting member together define a first variable pressure chamber. The first variable pressure chamber has a first air hole.

Another embodiment of the disclosure provides a method for removing a first substrate from a second substrate. The aforementioned device is provided. The first substrate is fixed to the carrier. The second substrate is fixed to the flexible member. A first internal pressure in the first variable pressure chamber is increased for curling the flexible member away from the carrier so as to remove the first substrate from the second substrate.

Yet another embodiment of the disclosure provides a method for adhering a first substrate to a second substrate. The aforementioned device is provided. The first substrate is fixed to the carrier. The second substrate is fixed to the flexible member. A first internal pressure in the first variable pressure chamber is decreased for curling the flexible member close to the carrier so as to adhere the second substrate to the first substrate.

BRIEF DESCRIPTION OF THE DRAWINGS

The present disclosure will become better understood from the detailed description given hereinbelow and the accompanying drawings which are given by way of illustration only and thus are not limitative of the present disclosure and wherein:

FIGS. 13A-13B are conceptual views showing processes for removing the second substrate from the first substrate by using a device for removing and adhering substrate according to a tenth embodiment of the present disclosure;

DETAILED DESCRIPTION

Figure 1:
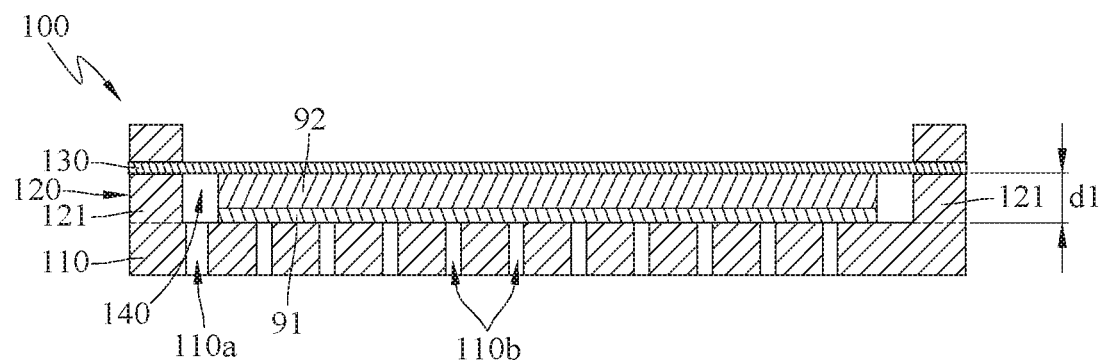
FIG. 1 is a cross-sectional view of a device for removing and adhering substrate before removing a second substrate from a first substrate according to a first embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a cross-sectional view of a device for removing and adhering substrate before removing a second substrate from a first substrate according to a first embodiment of the present disclosure. It is noted that the device can remove the second substrate from the first substrate or adhere the second substrate to the first substrate. As shown in FIG. 1, a device 100 is provided. The device 100 is for removing a second substrate 92 from a first substrate 91 or adhering the second substrate 92 to the first substrate 91, but the present disclosure is not limited to the positions of the first substrate 91 and the second substrate 92. For example, the positions of the first substrate 91 and the second substrate 92 can be switched; in such a case, the device 100 is able to remove the first substrate 91 from the second substrate 92 or adhere the first substrate 91 to the second substrate 92. Each of the first substrate 91 and the second substrate 92 is, for example, a protective substrate (layer), a flexible substrate (layer) or a glass substrate (layer). FIG. 1 shows that the substrates 91 and 92 are not separated yet.

In this embodiment, the device 100 includes a carrier 110, a supporting member 120 and a flexible member 130. The supporting member 120 is connected between the carrier 110 and the flexible member 130. The supporting member 120 includes a plurality of side walls 121. The side walls 121 are connected to and surrounded on the carrier 110. The flexible member 130 is fixed between the side walls 121 of the supporting member 120. The flexible member 130 and the carrier 110 are spaced a distance d1 from each other. The flexible member 130 is, for example, made of a flexible or elastic material such as rubber or silicone, but the disclosure is not limited thereto.

The carrier 110, the side walls 121 and the flexible member 130 together define a first variable pressure chamber 140. The first variable pressure chamber 140 has a first air hole 110a located on the carrier 110. The first air hole 110a is able to be connected to a pressure regulating device (not shown). The pressure regulating device is able to regulate first internal pressure of the first variable pressure chamber 140 by supplying or extracting air through the first air hole 110a. In addition, the present disclosure is not limited to the position of the first air hole 110a. For example, the first air hole 110a can be located on the supporting member 120. Furthermore, the air flowing through the first air hole 110a is, for example, helium, nitrogen, oxygen or a mixture of gases that surrounds the earth and forms its atmosphere.

In this embodiment, the first substrate 91 is a flexible substrate (layer) disposed on the carrier 110. The carrier 110 has a plurality of suction holes 110b. The first substrate 91 is disposed on the carrier 110 corresponding to the suction holes 110b. Specifically, the first substrate 91 covers some of the suction holes 110b. The suction holes 110b can be connected to the aforementioned pressure regulating device or another pressure regulating device (not shown). The said pressure regulating device is able to extract air in the first variable pressure chamber 140 through the suction holes 110b, thereby creating pressure difference between the first variable pressure chamber 140 and the suction holes 110b. Thus, the first internal pressure of the first variable pressure chamber 140 is greater than internal pressure of the suction holes 110b so that the first substrate 91 is able to be fixed on the carrier 110. The first substrate 91 is disposed between the second substrate 92 and the carrier 110. In this embodiment, the second substrate 92 is a glass substrate (layer) fixed on the flexible member 130.

However, the present disclosure is not limited to how the second substrate 92 is fixed on the flexible member 130 and the first substrate 91 is fixed on the carrier 110. In other embodiments, both the first substrate 91 and the second substrate 92 can respectively be fixed on the carrier 110 and the flexible member 130 by adhesive (not shown). In yet another embodiment, the flexible member 130 can have suction holes which are similar to the suction holes 110b on the carrier 110, the suction holes on the flexible member 130 are able to be connected to the said pressure regulating device for fixing the second substrate 92. In addition, in other embodiments, the first substrate 91 can be a glass substrate (layer), and the second substrate 92 can be a flexible substrate (layer), the disclosure is not limited thereto.

Figure 2:
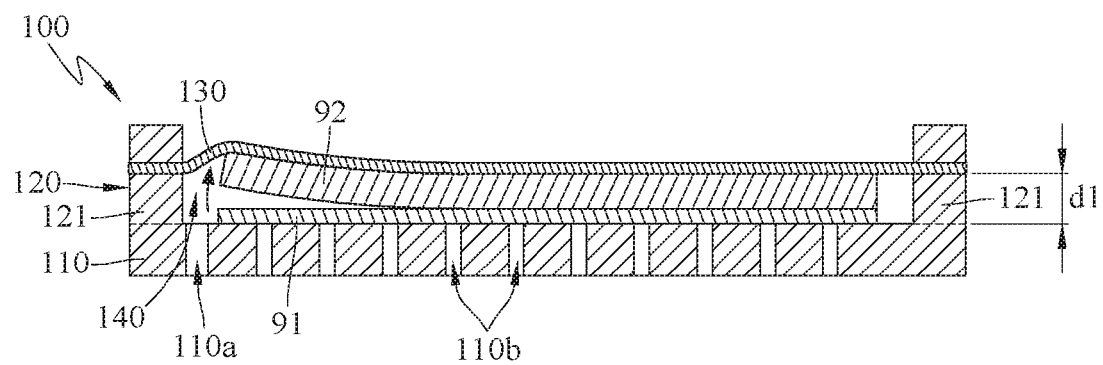
FIG. 2 is a conceptual view showing a process for removing the second substrate from the first substrate by using the device according to the first embodiment of the present disclosure.

Then, the process of removing the second substrate 92 will be described in below. Please refer to FIG. 2, which is a conceptual view showing a process for removing the second substrate from the first substrate by using the device according to the first embodiment of the present disclosure.

Firstly, the said pressure regulating device supplies air into the first variable pressure chamber 140 through the first air hole 110a, causing the first internal pressure to increase to exceed the atmospheres pressure. That is, the increased first internal pressure will be greater than ambient pressure (i.e. the atmospheric pressure); thus, a differential pressure between the first variable pressure chamber 140 and the environment is provided. In such a case, the second substrate 92 and the flexible member 130 are curled upwardly together by a driving force (i.e. the differential pressure) so as to peel the second substrate 92 from the first substrate 91 until the second substrate 92 is fully removed from (completely separated from) the first substrate 91. In addition, during the process of removing the second substrate 92 from the first substrate 91, the driving force is substantially evenly applied to the separated surfaces of the first substrate 91 and the second substrate 92. For example, the separated surface of the first substrate 91 is pushed evenly by the driving force, which cancels part of stress on the first substrate 91 generated by the second substrate 92 pulling the first substrate 91. Hence, a total stress on the first substrate 91 is reduced so as to prevent the first substrate 91 from breaking due to overly large stress thereon. In addition, according to a result of an air pressure simulation experiment, when the first internal pressure of the first variable pressure chamber 140 is increased to twenty times the atmospheric pressure during the process of removing the first substrate 91, the stress on the first substrate 91 is reduced by at least 20% as compared with the stress on the substrate by using the traditional removing process.

Figure 3:
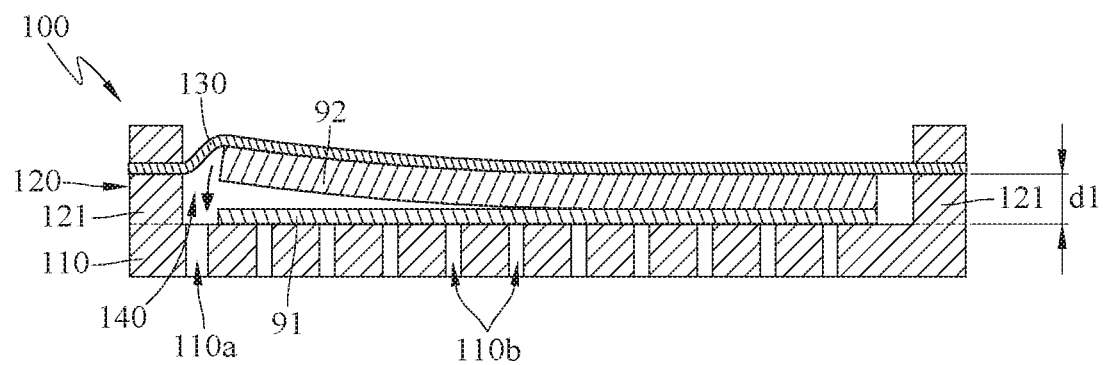
FIG. 3 is a conceptual view showing a process for adhering the second substrate to the first substrate by using the device according to the first embodiment of the present disclosure.

Then, the process of adhering the second substrate 92 to the first substrate 91 by using the aforementioned device 100 will be described in below. Please refer to FIG. 3, which is a conceptual view showing a process for adhering the second substrate to the first substrate by using the device according to the first embodiment of the present disclosure.

In this embodiment, the first substrate 91 is fixed on the carrier 110, and the second substrate 92 is fixed on the flexible member 130. The said pressure regulating device extracts air through the first air hole 110a, causing the first internal pressure of the first variable pressure chamber 140 to decrease to under the atmospheric pressure; thus, the differential pressure between the first variable pressure chamber 140 and the environment is provided. Then, the second substrate 92 and the flexible member 130 are curled downwardly together by a driving force (i.e. the differential pressure), causing the second substrate 92 to be adhered (attached or laminated) to the first substrate 91.

Then, the other embodiments of the device will be described in the description. It is noted that the first substrate 91, the second substrate 92 as well as the aforementioned processes in the following embodiments are similar to those of the first embodiment.

Figure 4:
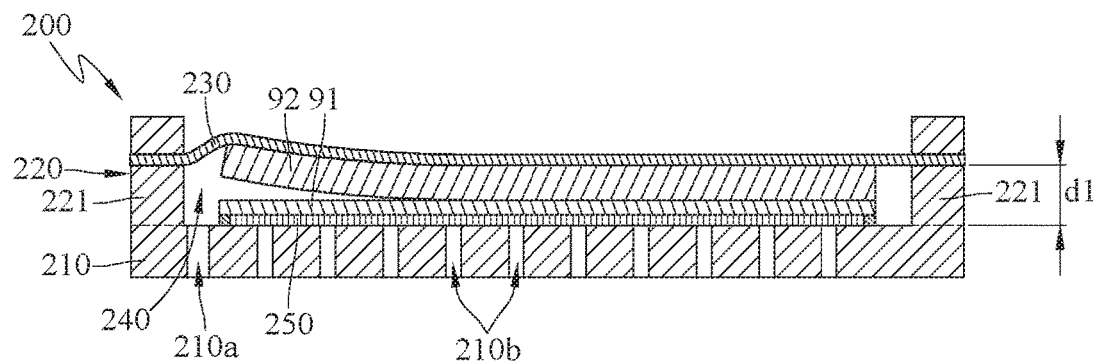
FIG. 4 is a conceptual view showing a process for removing the second substrate from the first substrate by using a device for removing and adhering substrate according to a second embodiment of the present disclosure.

Please refer to FIG. 4, which is a conceptual view showing a process for removing the second substrate from the first substrate by using a device for removing and adhering substrate according to a second embodiment of the present disclosure. As shown in FIG. 4, a device 200 is provided. The device 200 is similar to the device 100 of the first embodiment.

In this embodiment, the device 200 includes a carrier 210, a supporting member 220, and a flexible member 230. The supporting member 220 includes a plurality of side walls 221 connected to and surrounded on the carrier 210. The flexible member 230 is fixed between the side walls 221 of the supporting member 220. The flexible member 230 and the carrier 210 are spaced a distance d1 from each other. The flexible member 230 is, for example, made of a flexible or elastic material such as rubber or silicon, but the disclosure is not limited thereto.

The carrier 210, the side walls 221 of the supporting member 220 and the flexible member 230 together define a first variable pressure chamber 240. The first variable pressure chamber 240 has a first air hole 210a formed on the carrier 210. The first air hole 210a is able to be connected to a pressure regulating device (not shown). The pressure regulating device is able to regulate first internal pressure of the first variable pressure chamber 240 by supplying or extracting air through the first air hole 210a. The air flowing through the first air hole 210a is, for example, helium, nitrogen, oxygen or a mixture of gases that surrounds the earth and forms its atmosphere. In addition, the present disclosure is not limited to the position of the first air hole 210a. For example, the first air hole 210a can be formed on the supporting member 220. The carrier 210 has a plurality of suction holes 210b. The suction holes 210b can also be connected to the aforementioned pressure regulating device or another pressure regulating device (not shown). The said pressure regulating device is able to extract air in the suction holes 210b, thereby creating pressure difference between the first variable pressure chamber 240 and the suction holes 210b. Thus, the first internal pressure of the first variable pressure chamber 240 is greater than internal pressure of the suction holes 210b so that the first substrate 91 is able to be fixed on the carrier 210. The first substrate 91 is between the second substrate 92 and the carrier 210. The second substrate 92, for example, is fixed on the flexible member 230 by adhesive (not shown).

In this embodiment, the device 200 further includes a porous layer 250 disposed on the carrier 210. The first substrate 91 is disposed on the porous layer 250. That is, the porous layer 250 is disposed between the carrier 210 and the flexible member 230. The porous layer 250 is, for example, a layer having tiny through holes which are permeable by air or water, but the disclosure is not limited thereto. The porous layer 250 is corresponding to some of the suction holes 210b. The internal pressure of the suction holes 210b is evenly distributed around the surface of the first substrate 91 through the through holes on the porous layer 250. Thus, the first substrate 91 is able to be fixed on the carrier 210 via the porous layer 250. Since the sizes of the through holes on the porous layer 250 are much smaller than the sizes of the suction holes 210b, and the quantity of the through holes are much greater than the quantity of the suction holes 210b, the pressure can be distributed evenly on the surface of the first substrate 91 to avoid stress concentration on part of the surface of the first substrate 91.

Furthermore, in this or other embodiments, a part of the porous layer 250 may be covered by a patterned process in order to match the configuration of the first substrate 91. Thus, the internal pressure of the porous layer 250 is prevented from escaping from the part of the porous layer 250 which is not covered by the first substrate 91, thereby increasing the sucking force applied on the first substrate 91.

Figure 5A:
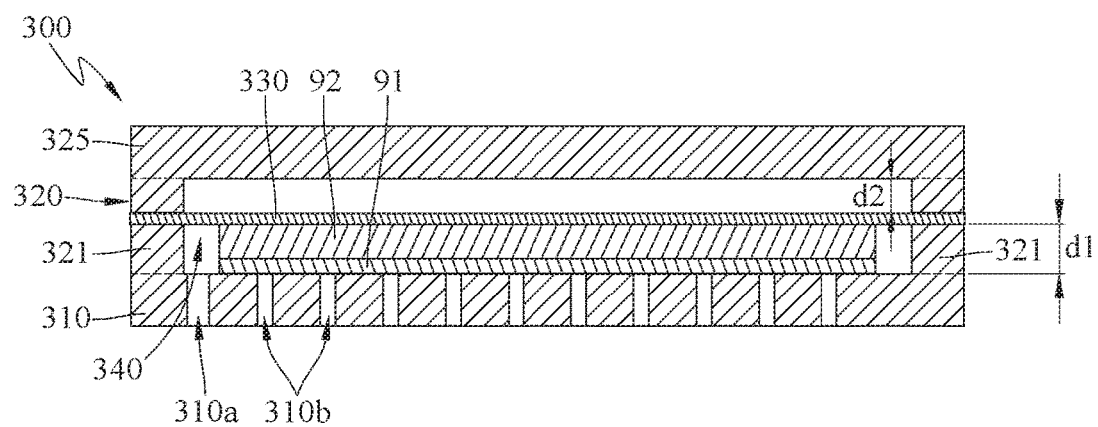
FIG. 5A is a cross-sectional view of a device for removing and adhering substrate before removing the second substrate from the first substrate according to a third embodiment of the present disclosure.
Figure 5B:
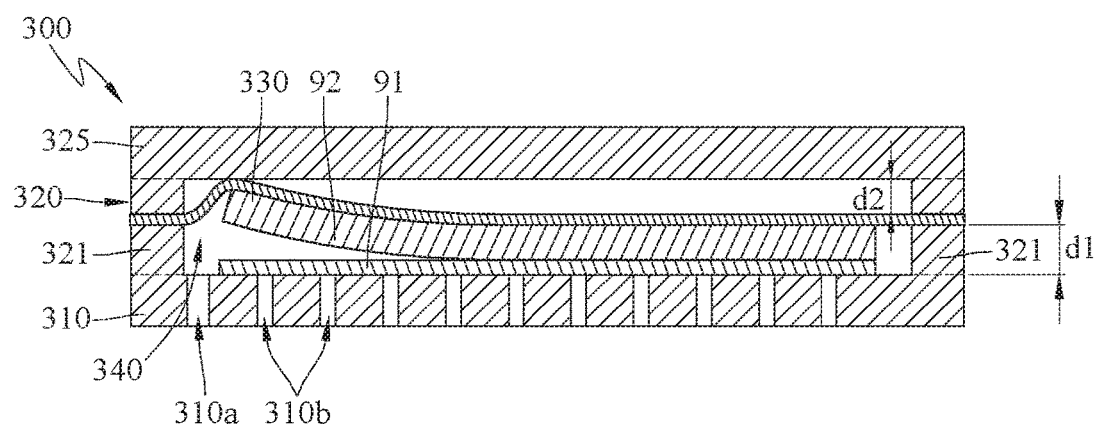
FIG. 5B is a conceptual view showing a process for removing the second substrate from the first substrate by using the device according to the third embodiment of the present disclosure.

Then, please refer to FIG. 5A~5B, FIG. 5A is a cross-sectional view of a device for removing and adhering substrate before removing the second substrate from the first substrate according to a third embodiment of the present disclosure. It is noted that the device can remove the second substrate from the first substrate or adhere the second substrate to the first substrate. FIG. 5B is a conceptual view showing a process for removing the second substrate from the first substrate by using the device according to the third embodiment of the present disclosure. As shown in FIG. 5A, a device 300 is provided. The device 300 is similar to the device 100 of the first embodiment.

In this embodiment, the device 300 includes a carrier 310, a supporting member 320 and a flexible member 330. The supporting member 320 includes a plurality of side walls 321 connected to and surrounded on the carrier 310. The flexible member 330 is fixed between the side walls 321 of the supporting member 320. The flexible member 330 and the carrier 310 are spaced a distance d1 from each other. The flexible member 330 is, for example, made of a flexible or elastic material such as rubber or silicon, but the disclosure is not limited thereto.

The carrier 310, the side walls 321 of the supporting member 320 and the flexible member 330 together define a first variable pressure chamber 340. The first variable pressure chamber 340 has a first air hole 310a formed on the carrier 310. The first air hole 310a is able to be connected to a pressure regulating device (not shown). The pressure regulating device is able to regulate first internal pressure of the first variable pressure chamber 340 by supplying or extracting air through the first air hole 310a. In addition, the present disclosure is not limited to the position of the first air hole 310a. For example, the first air hole 210a can be formed on the supporting member 320. The carrier 310 has a plurality of suction holes 310b. The suction holes 310b can also be connected to the aforementioned pressure regulating device or another pressure regulating device (not shown). The pressure regulating device is able to extract air in the first variable pressure chamber 340 through the suction holes 310b, thereby creating pressure difference between the first variable pressure chamber 340 and the suction holes 310b. Thus, the first internal pressure of the first variable pressure chamber 340 is greater than internal pressure of the suction holes 310b so that the first substrate 91 is able to be fixed on the carrier 310. The first substrate 91 is between the second substrate 92 and the carrier 310. The second substrate 92 is fixed on the flexible member 330 by, for example, adhesive (not shown), but the disclosure is not limited thereto.

In this embodiment, the supporting member 320 further includes a cover 325. The cover 325 is disposed on a side of the side walls 321 which is opposite to the carrier 310. That is, the side walls 321 are disposed between the cover 325 and the carrier 310. In addition, the cover 325 and the flexible member 330 are spaced a distance d2 from each other. As shown in FIG. 5B, during the process of removing the second substrate 92, the cover 325 is able to constrain the deformation of the curled upwardly flexible member 330 in a desired range. Thus, the flexible member 330 is prevented from being overly curled so as to prevent the second substrate 92 on the flexible member 330 from breaking.

Figure 6:
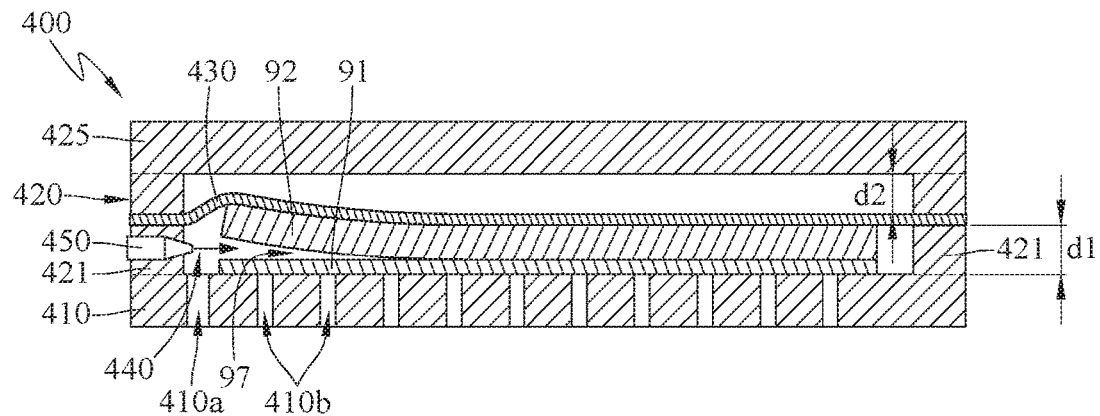
FIG. 6 is a conceptual view showing a crack between the first substrate and the second substrate before removing the second substrate from the first substrate by using a device for removing and adhering substrate according to a fourth embodiment of the present disclosure.

Then, please refer to FIG. 6, which is a conceptual view showing a crack between the first substrate and the second substrate before removing the second substrate from the first substrate by using a device for removing and adhering substrate according to a fourth embodiment of the present disclosure. For instance, the device can remove a second substrate from a first substrate or adhere the second substrate to the first substrate. As shown in FIG. 6, a device 400 is provided. The device 400 is similar to the device 300 of the third embodiment. In this embodiment, the device 400 includes a carrier 410, a supporting member 420 and a flexible member 430. The supporting member 420 includes a plurality of side walls 421 and a cover 425. The side walls 421 are connected to and surrounded on the carrier 410. The cover 425 is disposed on a side of the side walls 421 which is opposite to the carrier 410. That is, the side walls 421 are between the cover 425 and the carrier 410. The flexible member 430 is fixed between the side walls 421 of the supporting member 420. The flexible member 430 and the carrier 410 are spaced a distance d1 from each other. The cover 425 and the flexible member 430 are spaced a distance d2 from each other. However, the cover 425 is optional and can be altered according to actual requirement. The flexible member 430 is, for example, made of a flexible or elastic material such as rubber or silicon, but the disclosure is not limited thereto.

The carrier 410, the side walls 421 of the supporting member 420 and the flexible member 430 together define a first variable pressure chamber 440. The first variable pressure chamber 440 has a first air hole 410a formed on the carrier 410. The first air hole 410a is able to be connected to a pressure regulating device (not shown). The pressure regulating device is able to regulate first internal pressure of the first variable pressure chamber 440 by supplying or extracting air through the first air hole 410a. In addition, the present disclosure is not limited to the position of the first air hole 410a. For example, the first air hole 410a can be formed on the supporting member 420. The carrier 410 has a plurality of suction holes 410b. The suction holes 410b can also be connected to the aforementioned pressure regulating device or another pressure regulating device (not shown). The said pressure regulating device is able to extract air in the first variable pressure chamber 440 through the suction holes 410b, thereby creating pressure difference between the first variable pressure chamber 440 and the suction holes 410b. Thus, the first internal pressure of the first variable pressure chamber 440 is greater than internal pressure of the suction holes 110b so that the first substrate 91 is able to be fixed on the carrier 410. The first substrate 91 is between the second substrate 92 and the carrier 410. The second substrate 92 is fixed on the flexible member 430 by, for example, adhesive (not shown), but the disclosure is not limited thereto.

In this embodiment, the device 400 further includes a remove trigger 450 disposed on one of the side walls 421. The remove trigger 450 is, for example, a high pressure nozzle. The remove trigger 450 is able to be connected to an air supply device (not shown), and the air supply device is able to supply a strong airflow into the first variable pressure chamber 440 through the remove trigger 450. Thus, before the process of removing the second substrate 92, the strong airflow is applied on the edge between the first substrate 91 and the second substrate 92 for separating a part of the second substrate 92 from the first substrate 91 to produce a crack 97 therebetween. Therefore, during the process of removing the second substrate 92, the second substrate 92 can start to curl from the crack 97, which makes the second substrate 92 to be removed from the first substrate 91 in a more easily way.

Figure 7A:
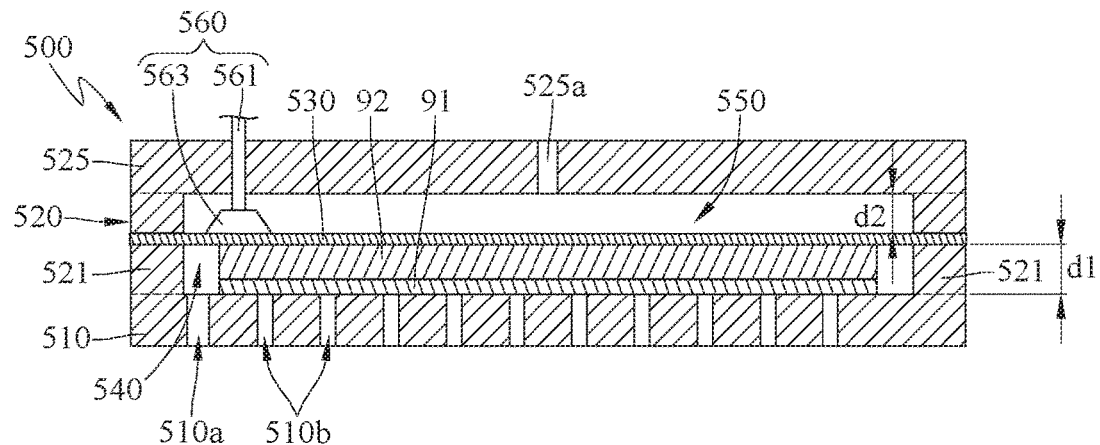
FIG. 7A is a cross-sectional view of a device for removing and adhering substrate before removing the second substrate from the first substrate according to a fifth embodiment of the present disclosure.
Figure 7B:
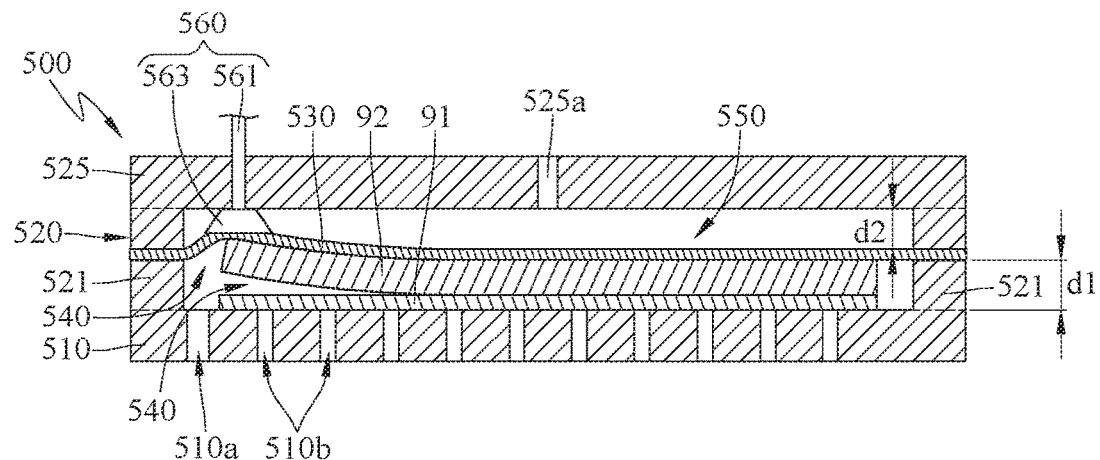
FIG. 7B is a conceptual view showing a crack between the first substrate and the second substrate before removing the second substrate from the first substrate by using the device according to the fifth embodiment of the present disclosure.

Please refer to FIG. 7A~7B, FIG. 7A is a cross-sectional view of a device for removing and adhering substrate before removing the second substrate from the first substrate according to a fifth embodiment of the present disclosure, and FIG. 7B is a conceptual view showing a crack between the first substrate and the second substrate before removing the second substrate from the first substrate by using the device according to the fifth embodiment of the present disclosure. It is noted that the device can remove the second substrate from the first substrate or adhere the second substrate to the first substrate. As shown in FIG. 7A, a device 500 is provided. The device 500 is similar to the device 400 of the fourth embodiment.

In this embodiment, the device 500 includes a carrier 510, a supporting member 520, a flexible member 530 and a remove trigger 560. The supporting member 520 includes a plurality of side walls 521 and a cover 525. The side walls 521 are connected to and surrounded on the carrier 510. The cover 525 is disposed on a side of the side walls 521 which is opposite to the carrier 510. That is, the side walls 521 are between the cover 525 and the carrier 510. The flexible member 530 is fixed between the side walls 521. The flexible member 530 and the carrier 510 are spaced a distance d1 from each other. The flexible member 530 and the cover 525 are spaced a distance d2 from each other. The remove trigger 560 is disposed on the supporting member 520. The flexible member 530 is, for example, made of a flexible or elastic material such as rubber or silicon, but the disclosure is not limited thereto.

The carrier 510, the side walls 521 of the supporting member 520 and the flexible member 530 together define a first variable pressure chamber 540. The cover 525 and the flexible member 530 together define a second variable pressure chamber 550. The first variable pressure chamber 540 has a first air hole 510a formed on the carrier 510. The second variable pressure chamber 550 has a second air hole 525a formed on the cover 525. The first air hole 510a and the second air hole 525a are able to be connected to a pressure regulating device (not shown). The said pressure regulating device is able to regulate first internal pressure of the first variable pressure chamber 540 and second internal pressure of the second variable pressure chamber 550 by respectively supplying or extracting air through the first air hole 510a and the second air hole 525a. The air flowing through the first air hole 510a and the second air hole 525a is, for example, helium, nitrogen, oxygen or a mixture of gases that surrounds the earth and forms its atmosphere. In addition, the present disclosure is not limited to the position of the first air hole 510a. For example, the first air hole 510a can be formed on the supporting member 520. The second air hole 525a is optional and can be altered according to actual requirement. The carrier 510 has a plurality of suction holes 510b. The suction holes 510b can be connected to the aforementioned pressure regulating device or another pressure regulating device (not shown). The said pressure regulating device is able to extract air in the first variable pressure chamber 540 through the suction holes 510b, thereby creating pressure difference between the first variable pressure chamber 540 and the suction holes 510b. Thus, the first internal pressure of the first variable pressure chamber 540 is greater than internal pressure of the suction holes 510b so that the first substrate 91 is able to be fixed on the carrier 510. The first substrate 91 is between the second substrate 92 and the carrier 510. The second substrate 92 is fixed on the flexible member 530 by, for example, adhesive (not shown), but the disclosure is not limited thereto.

A difference between this embodiment and the forth embodiment is that the remove trigger 560 includes a linkage 561 and a sucking disk 563. One end of the linkage 561 is movably disposed on the cover 525, but the present disclosure is not limited to the position of the linkage 561. For example, the linkage 561 may be disposed on the side walls 521. The sucking disk 563 is connected to the linkage 561. The flexible member 530 is attached to the sucking disk 563. As shown in FIG. 7B, before the process of removing the second substrate 92, the linkage 561 can pull the sucking disk 563 up so that the sucking disk 563 can pull up a part of the second substrate 92. Thus, a crack 97 is produced between the second substrate 92 and the first substrate 91. Therefore, during the process of removing the second substrate 92, the second substrate 92 can start to curl from the crack 97, which makes the second substrate 92 to be removed from the first substrate 91 in a more easily way.

Figure 8A:
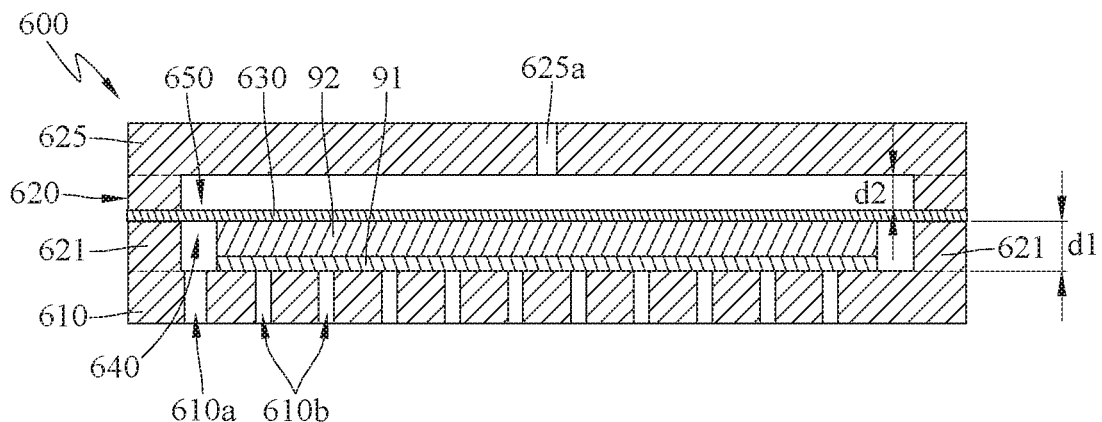
FIG. 8A is a cross-sectional view of a device for removing and adhering substrate before removing the second substrate from the first substrate according to a sixth embodiment of the present disclosure.
Figure 8B:
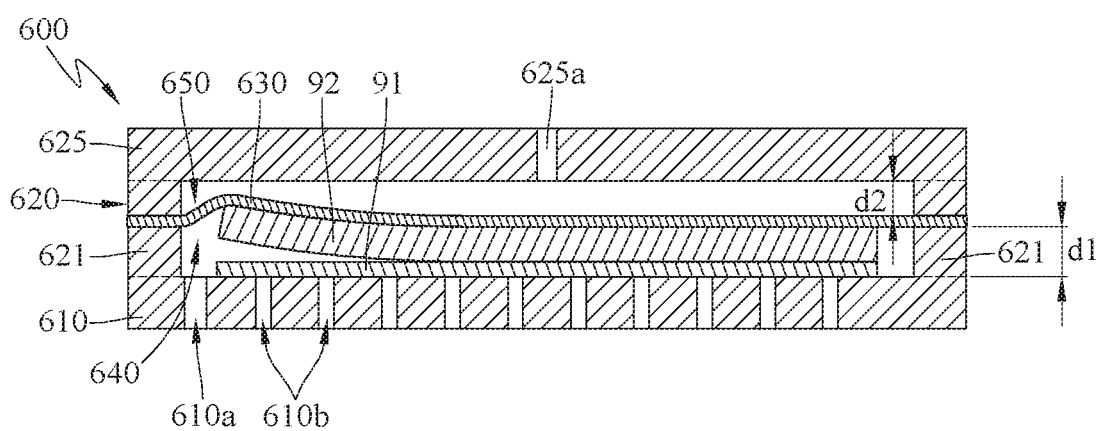
FIG. 8B is a conceptual view showing a process for removing the second substrate from the first substrate by using the device according to the sixth embodiment of the present disclosure.

Then, please refer to FIG. 8A~8B, FIG. 8A is a cross-sectional view of a device for removing and adhering substrate before removing the second substrate from the first substrate according to a sixth embodiment of the present disclosure, and FIG. 8B is a conceptual view showing a process for removing the second substrate from the first substrate by using the device according to the sixth embodiment of the present disclosure. For instance, the device can remove a second substrate from a first substrate or adhere the second substrate to the first substrate. As shown in FIG. 8A, a device 600 is provided. The device 600 is similar to the device 300 of the third embodiment.

In this embodiment, the device 600 includes a carrier 610, a supporting member 620 and a flexible member 630. The supporting member 620 includes a plurality of side walls 621 and a cover 625. The side walls 621 are connected to and surrounded on the carrier 610. The cover 625 is disposed on a side of the side walls 621 which is opposite to the carrier 610. That is, the side walls 621 are between the cover 625 and the carrier 610. The flexible member 630 is fixed between the side walls 621. The flexible member 630 and the carrier 610 are spaced a distance d1 from each other. The cover 625 and the flexible member 630 are spaced a distance d2 from each other. The flexible member 630 is, for example, made of a flexible or elastic material such as rubber or silicon, but the disclosure is not limited thereto.

The carrier 610, the side walls 621 of the supporting member 620 and the flexible member 630 together define a first variable pressure chamber 640. The first variable pressure chamber 640 has a first air hole 610a formed on the carrier 610. The first air hole 610a is able to be connected to a pressure regulating device (not shown). The said pressure regulating device is able to regulate first internal pressure of the first variable pressure chamber 640 by supplying or extracting air through the first air hole 610a. In addition, the present disclosure is not limited to the position of the first air hole 610a. For example, the first air hole 610a can be formed on the supporting member 620. The carrier 610 has a plurality of suction holes 610b. The suction holes 610b can also be connected to the aforementioned pressure regulating device or another pressure regulating device (not shown). The said pressure regulating device is able to extract air in the first variable pressure chamber 640 through the suction holes 610b, thereby creating pressure difference between the first variable pressure chamber 640 and the suction holes 610b. Thus, the first internal pressure of the first variable pressure chamber 640 is greater than internal pressure of the suction holes 610b so that the first substrate 91 is able to be fixed on the carrier 610. The first substrate 91 is between the second substrate 92 and the carrier 610. The second substrate 92 is fixed on the flexible member 630 by, for example, adhesive (not shown), but the disclosure is not limited thereto.

In this embodiment, the cover 625 and the flexible member 630 together define a second variable pressure chamber 650. The second variable pressure chamber 650 has a second air hole 625a formed on the cover 625. The second air hole 625a is able to be connected to the aforementioned pressure regulating device or another pressure regulating device. The said pressure regulating device is able to regulate the second internal pressure of the second variable pressure chamber 650 by supplying or extracting air through the second air hole 625a. The air flowing through the second air hole 625a is, for example, helium, nitrogen, oxygen or a mixture of gases that surrounds the earth and forms its atmosphere.

Since the second internal pressure of the second variable pressure chamber 650 can be regulated, the pressures on both two opposite sides of the flexible member 630 can be controlled. Thus, the deformation of the flexible member 630 can be controlled more precisely, which helps the removing process or the adhering process to perform. For example, during the process of removing the second substrate 92, the second internal pressure can be decreased for maintaining the second substrate 92 to be curled upwardly. Thus, the curled second substrate 92 is prevented from falling back to the first substrate 91, thereby increasing the success rate of the removing process.

Please see FIG. 9A-9E, which are pressure-time charts showing the variations of first internal pressure and second internal pressure in the device according to the sixth embodiment of the present disclosure. In FIG. 9A-9E, the first internal pressure is P1, and the second internal pressure is P2.

Figure 9A:
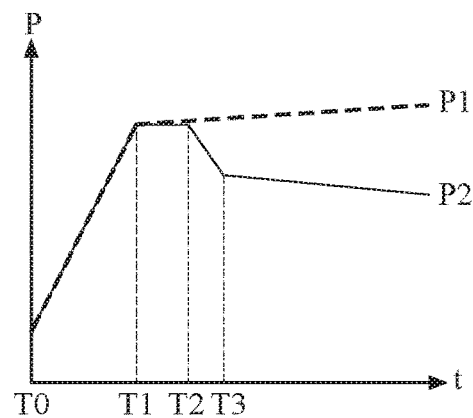
FIGS. 9A-9E are pressure-time charts showing the variations of first internal pressure and second internal pressure in the device according to the sixth embodiment of the present disclosure.

Firstly, as shown in FIG. 9A, during time T0 to time T1, both the first internal pressure P1 of the first variable pressure chamber 640 and the second internal pressure P2 of the second variable pressure chamber 650 are increased simultaneously. After time T1, the first internal pressure P1 is increased at a slower rate until the removing process is finished, and the second internal pressure P2 is increased at a slightly slower rate until time T2. After time T2, the second internal pressure P2 is decreased rapidly until time T3. During time T2 to time T3, the difference between the first internal pressure P1 and the second internal pressure P2 is produced very suddenly. After time T3, the decreasing rate of the second internal pressure P2 becomes gentle. Thus, a rate-of-change of the difference between the first internal pressure P1 and the second internal pressure P2 becomes gentle, which makes the second substrate 92 to be gradually peeled from the first substrate 91.

Figure 9B:
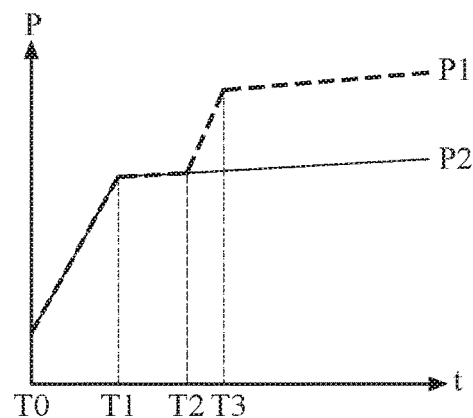

Then, as shown in FIG. 9B, the variation of the internal pressure between time T0 and time T1 is similar to those of FIG. 9A, thus only the differences between FIG. 9B and FIG. 9A are described herein. After time T1, the increasing rate of the second internal pressure P2 becomes gentle until the removing process is finished. During time T1 to time T2, the increasing rate of the first internal pressure P1 is substantially the same as the one of the second internal pressure P2. After time T2, the first internal pressure P1 is increased rapidly until time T3. After time T3, the increasing rate of the first internal pressure P1 becomes gentle again.

Figure 9C:
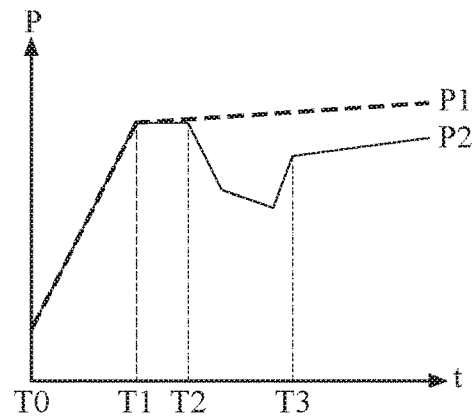

Then, as shown in FIG. 9C, the variation of the internal pressure between time T0 and time T2 are similar to those of FIG. 9A, thus only the differences between FIG. 9C and FIG. 9A are described herein. During time T2 to time T3, the second internal pressure P2 goes through rapid changes. After time T3, the increasing rate of the second internal pressure P2 becomes gentle and is slightly higher than the one of the first internal pressure P1, thus the difference between the first internal pressure P1 and the second internal pressure P2 is gradually reduced after time T3.

Figure 9D:
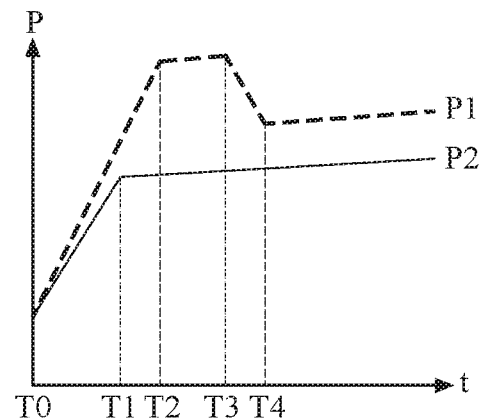

Then, as shown FIG. 9D, since time T0, the first internal pressure P1 and the second internal pressure P2 are simultaneously increased. The increasing rate of the second internal pressure P2 is less than the one of the first internal pressure P1. After time T1, the increasing rate of the second internal pressure P2 becomes gentle until the removing process is finished. After time T2, the increasing rate of the first internal pressure P1 becomes gentle until time T3. Then, the first internal pressure P1 is rapidly decreased during time T3 to T4, thus the difference between the first internal pressure P1 and the second internal pressure P2 is decreased rapidly. After time T4, the increasing rate of the first internal pressure P1 is adjusted to substantially the same as the one of the second internal pressure P2, that is, both the first internal pressure P1 and the second internal pressure P2 are increased in the substantially same rate-of-change until the removing process is finished.

Figure 9E:
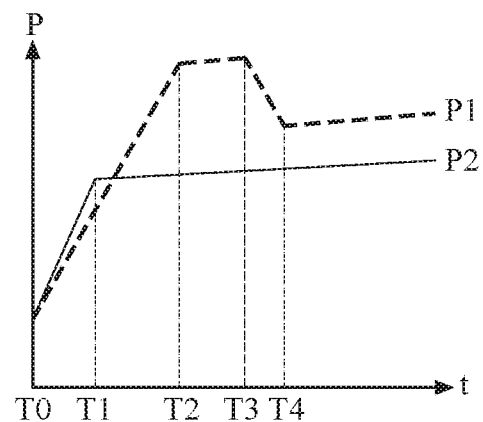

Then, as shown in FIG. 9E, the variations of the internal pressure between FIG. 9E and FIG. 9D are similar, thus only the difference therebetween are described herein. Since time T0, the first internal pressure P1 and the second internal pressure P2 are simultaneously increased, but the increasing rate of the second internal pressure P2 is greater than the one of the first internal pressure P1, which helps to position the second substrate 92 before the process of removing the second substrate 92.

Figure 10:
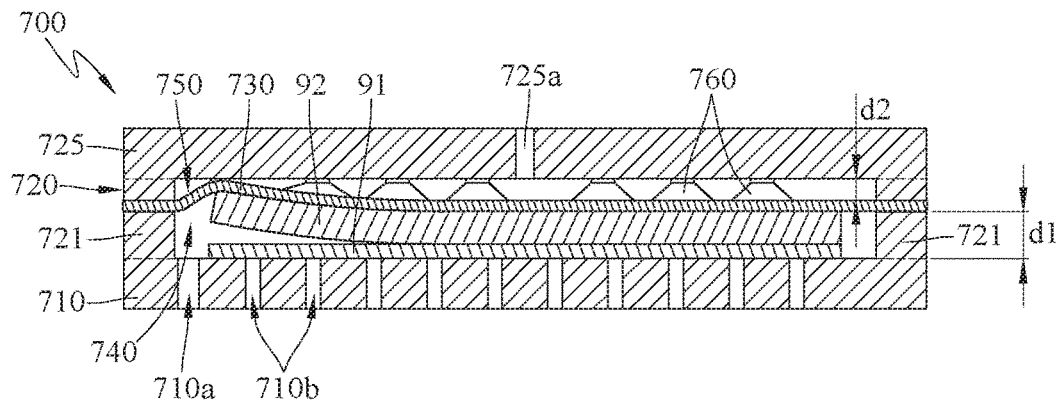
FIG. 10 is a conceptual view showing a process for removing the second substrate from the first substrate by using a device for removing and adhering substrate according to a seventh embodiment of the present disclosure.

Then, please refer to FIG. 10, which is a conceptual view showing a process for removing the second substrate from the first substrate by using a device for removing and adhering substrate according to a seventh embodiment of the present disclosure. It is noted that the device can remove the second substrate from the first substrate or adhere the second substrate to the first substrate. As shown in FIG. 10, a device 700 is provided. The device 700 is similar to the device 600 of the sixth embodiment.

In this embodiment, the device 700 includes a carrier 710, a supporting member 720 and a flexible member 730. The supporting member 720 includes a plurality of side walls 721 and a cover 725. The side walls 721 are connected to and surrounded on the carrier 710. The cover 725 is disposed on a side of the side walls 721 which is opposite to the carrier 710. That is, the side walls 721 are between the cover 725 and the carrier 710. The flexible member 730 is fixed between the side walls 721. The flexible member 730 and the carrier 710 are spaced a distance d1 from each other. The flexible member 730 and the cover 725 are spaced a distance d2 from each other. The flexible member 730 is, for example, made of a flexible or elastic material such as rubber or silicon, but the disclosure is not limited thereto.

The carrier 710, the side walls 721 of the supporting member 720 and the flexible member 730 together define a first variable pressure chamber 740. The cover 725 and the flexible member 730 together define a second variable pressure chamber 750. The first variable pressure chamber 740 has a first air hole 710a formed on the carrier 710. The second variable pressure chamber 750 has a second air hole 725a formed on the cover 725. The first air hole 710a and the second air hole 725a are able to be connected to a pressure regulating device (not shown). The said pressure regulating device is able to regulate first internal pressure of the first variable pressure chamber 740 and the second internal pressure of the second variable pressure chamber 750 by respectively supplying or extracting air through the first air hole 710a and the second air hole 725a. The air flowing through the first air hole 710a and the second air hole 725a is, for example, helium, nitrogen, oxygen or a mixture of gases that surrounds the earth and forms its atmosphere. In this embodiment, the second air hole 725a is optional and can be altered according to actual requirement. The carrier 710 has a plurality of suction holes 710b. The suction holes 710b can also be connected to the aforementioned pressure regulating device or another pressure regulating device (not shown). The said pressure regulating device is able to extract air in the first variable pressure chamber 740 through the suction holes 710*b*, thereby creating pressure difference between the first variable pressure chamber 740 and the suction holes 710*b*. Thus, the first internal pressure of the first variable pressure chamber 740 is greater than internal pressure of the suction holes 710*b* so that the first substrate 91 is able to be fixed on the carrier 710. The first substrate 91 is between the second substrate 92 and the carrier 710. The second substrate 92 is fixed on the flexible member 730 by, for example, adhesive (not shown), but the disclosure is not limited thereto.

In this embodiment, the device 700 further includes a plurality of sucking disks 760 fixed to the cover 725 and disposed between the cover 725 and the flexible member 730. Each of the sucking disks 760 is, for example, a flexible or elastic material such as rubber or silicone, but the disclosure is not limited thereto. During the process of removing the second substrate 92, since the flexible member 730 is attached to the sucking disks 760, the part of the second substrate 92 which is separated from the first substrate 91 is prevented from falling back to the first substrate 91, thereby increasing the success rate of the removing process.

Figure 11:
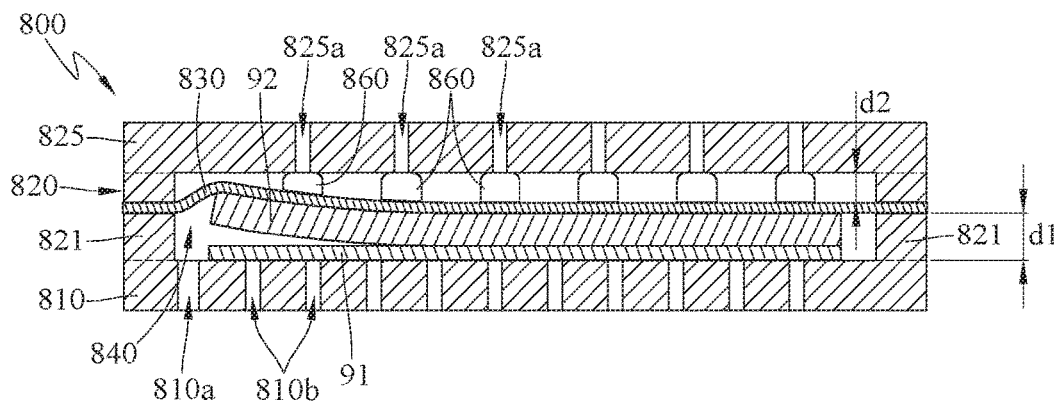
FIG. 11 is a conceptual view showing a process for removing the second substrate from the first substrate by using a device for removing and adhering substrate according to a eighth embodiment of the present disclosure.

Then, please refer to FIG. 11, which is a conceptual view showing a process for removing the second substrate from the first substrate by using a device for removing and adhering substrate according to a eighth embodiment of the present disclosure. For instance, the device can remove a second substrate from a first substrate or adhere the second substrate to the first substrate. As shown in FIG. 11, a device 800 is provided. The device 800 is similar to the device 700 of the seventh embodiment.

In this embodiment, the device 800 includes a carrier 810, a supporting member 820, a flexible member 830 and a plurality of sucking disks 860. The supporting member 820 includes a plurality of side walls 821 and a cover 825. The side walls 821 are connected and surrounded on the carrier 810. The cover 825 is disposed on a side of the side walls 821 which is opposite to the carrier 810. That is, the side walls 821 are between the cover 825 and the carrier 810. The flexible member 830 is fixed between the side walls 821 of the supporting member 820. The flexible member 830 and the carrier 810 are spaced a distance d1 from each other. The flexible member 830 and the cover 825 are spaced a distance d2 from each other. The sucking disks 860 are fixed to the cover 825 and between the cover 825 and the flexible member 830. Each of the sucking disks 860 may be a sucker and is, for example, made of a flexible or elastic material such as rubber or silicon or composed of a structure which the length can be changed by adjusting internal pressure therein, but the disclosure is not limited thereto. The length of the sucking disk 860 may be changed by changing internal pressure therein. In addition, the sucking disks 860 are arranged in a two dimensional array. The flexible member 830 is, for example, made of a flexible or elastic material such as rubber or silicon, but the disclosure is not limited thereto.

The carrier 810, the side walls 821 of the supporting member 820 and the flexible member 830 together define a first variable pressure chamber 840. The first variable pressure chamber 840 has a first air hole 810*a* formed on the carrier 810. The first air hole 810*a* is able to be connected to a pressure regulating device (not shown). The pressure regulating device is able to regulate first internal pressure of the first variable pressure chamber 840 by supplying or extracting air through the first air hole 810*a*. The air flowing through the first air hole 810*a* is, for example, helium, nitrogen, oxygen or a mixture of gases that surrounds the earth and forms its atmosphere. The carrier 810 has a plurality of suction holes 810*b*. The suction holes 810*b* can also be connected to the aforementioned pressure regulating device or another pressure regulating device (not shown). The said pressure regulating device is able to extract air in the first variable pressure chamber 840 through the suction holes 810*b*, thereby pressure difference between the first variable pressure chamber 840 and the suction holes 810*b*. Thus, the first internal pressure of the first variable pressure chamber 840 is greater than internal pressure of the suction holes 810*b* so that the first substrate 91 is able to be fixed on the carrier 810. The first substrate 91 is between the second substrate 92 and the carrier 810. The second substrate 92 is fixed on the flexible member 130 by, for example, adhesive (not shown), but the disclosure is not limited thereto.

In this embodiment, the cover 825 further has a plurality of second air holes 825*a*. The second air holes 825*a* are connected to and corresponding to the sucking disks 860, respectively. In addition, the second air holes 825*a* can also be connected to the aforementioned pressure regulating device or another pressure regulating device (not shown). The pressure regulating device can supply or extract air through the second air holes 825*a* so as to respectively regulate the internal pressure in the sucking disks 860. Thus, the length of each of the sucking disks 860 is able to be changed when the pressure regulating device decreases the internal pressure of one of the sucking disk 860 so that the length the sucking disk 860 becomes smaller. Accordingly, during the removing or adhering process, the pressure regulating device can sequentially supply or extract air to second air holes 825*a* so as to sequentially adjust the lengths of the sucking disks 860. Therefore, the deformation of the flexible member 830 can be controlled more precisely by adjusting the lengths of the sucking disks 860, which helps the removing process or the adhering process to perform.

Figure 12:
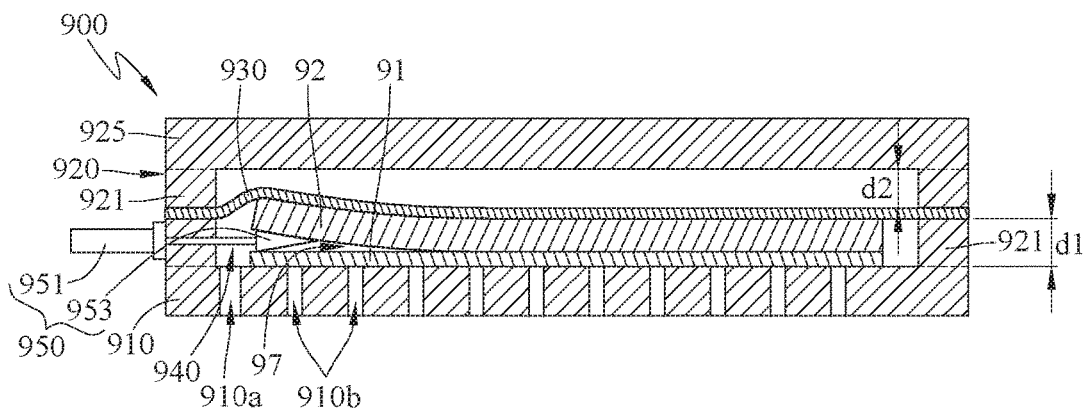
FIG. 12 is a conceptual view showing a crack between the first substrate and the second substrate before removing the second substrate from the first substrate by using a device for removing and adhering substrate according to a ninth embodiment of the present disclosure.

Then, please refer to FIG. 12, which is a conceptual view showing a crack between the first substrate and the second substrate before removing the second substrate from the first substrate by using a device for removing and adhering substrate according to a ninth embodiment of the present disclosure. It is noted that the device can remove the second substrate from the first substrate or adhere the second substrate to the first substrate. As shown in FIG. 12, a device 900 is provided. The device 900 is similar to the device 400 of the fourth embodiment.

In this embodiment, the device 900 includes a carrier 910, a supporting member 920, a flexible member 930 and a remove trigger 950. The supporting member 920 includes a plurality of side walls 921 and a cover 925. The side walls 921 are connected to and surrounded on the carrier 910. The cover 925 is disposed on a side of the side walls 921 which is opposite to the carrier 910. That is, the side walls 921 are between the cover 925 and the carrier 910. The flexible member 930 is fixed between the side walls 921. The flexible member 930 and the carrier 910 are spaced a distance d1 from each other. The flexible member 930 and the cover 925 are spaced a distance d2 from each other. However, the cover 925 is optional and can be altered according to actual requirement. The flexible member 930 is, for example, made of a flexible or elastic material such as rubber or silicon, but the disclosure is not limited thereto.

The carrier 910, the side walls 921 of the supporting member 920 and the flexible member 930 together define a first variable pressure chamber 940. The first variable pressure chamber 940 has a first air hole 910*a* formed on the carrier 910. The first air hole 910*a* is able to be connected to a pressure regulating device (not shown). The pressure regulating device is able to regulate first internal pressure of the first variable pressure chamber 940 by supplying or extracting air through the first air hole 910a. However, the present disclosure is not limited to the position of the first air hole 910a. For example, the first air hole 910a can be formed on the supporting member 920. The air flowing through the first air hole 910a is, for example, helium, nitrogen, oxygen or a mixture of gases that surrounds the earth and forms its atmosphere.

The carrier 910 has a plurality of suction holes 910b formed on the carrier 910. The suction holes 910b can also be connected to the aforementioned pressure regulating device or another pressure regulating device (not shown). The said pressure regulating device is able to extract air in the first variable pressure chamber 940 through the suction holes 910b, thereby creating pressure difference between the first variable pressure chamber 940 and the suction holes 910b. Thus, the first internal pressure of the first variable pressure chamber 940 is greater than internal pressure of the suction holes 910b so that the first substrate 91 is able to be fixed on the carrier 910. The first substrate 91 is between the second substrate 92 and the carrier 910. The second substrate 92 is fixed on the flexible member 930 by, for example, adhesive (not shown), but the disclosure is not limited thereto.

In this embodiment, the remove trigger 950 includes a driving member 951 and a wedge head 953. The driving member 951 is disposed on the side walls 921 of the supporting member 920, and the wedge head 953 is movably disposed on the driving member 951. The driving member 951 is able to push the wedge head 953 toward the first variable pressure chamber 940. Thus, before the process of removing the second substrate 92, the wedge head 953 is aimed toward the edge between the first substrate 91 and the second substrate 92 for producing a crack 97 therebetween. Therefore, during the process of removing the second substrate 92, the second substrate 92 can start to curl from the crack 97, which makes the second substrate 92 to be removed from the first substrate 91 in a more easily way.

Then, please refer to FIG. 13A~13B, which are conceptual views showing processes for removing the second substrate from the first substrate by using a device for removing and adhering substrate according to a tenth embodiment of the present disclosure. It is noted that the device can remove the second substrate from the first substrate or adhere the second substrate to the first substrate. As shown in FIG. 13A, a device 1000 is provided. The device 1000 includes a carrier 1010, a supporting member 1020, a flexible member 1030 and two height adjusting mechanisms 1050. The supporting member 1020 is connected between the carrier 1010 and the flexible member 1030. The height adjusting mechanisms 1050 are connected to the supporting member 1020 and the carrier 1010. The supporting member 1020 includes a plurality of side walls 1021, a plurality of bottom parts 1023 and a cover 1025. The side walls 1021 are connected to and surrounded on the bottom parts 1023. The cover 1025 is disposed on a side of the side walls 1021 which is opposite to the bottom parts 1023. That is, the side walls 1021 are disposed between the cover 1025 and the bottom parts 1023. However, the cover 1025 is optional and can be altered according to actual requirement. The carrier 1010 is connected between the side walls 1021. The carrier 1010 and the bottom parts 1023 are spaced a distance d3 from each other. The flexible member 1030 is fixed to the side walls 1021. The flexible member 1030 and the cover 1025 are spaced a distance d2 from each other. The flexible member 1030 and the carrier 1010 are spaced a distance d4 from each other. The height adjusting mechanism 1050 is movably disposed between the bottom parts 1023 and the carrier 1010. However, the present disclosure is not limited to the quantity of the height adjusting mechanisms 1050. In other embodiments, the quantity of the height adjusting mechanism 1050 can be one. The carrier 1010 is movably disposed on the height adjusting mechanism 1050. The distance d4 between the flexible member 1030 and the carrier 1010 can be adjusted by adjusting the distance d3 between the carrier 1010 and the bottom parts 1023. The flexible member 1030 is, for example, made of a flexible or elastic material such as rubber or silicon, but the disclosure is not limited thereto. The height adjusting mechanism 1050 is, for example, a screw, but the disclosure is not limited thereto.

The carrier 1010, the side walls 1021 of the supporting member 1020 and the flexible member 1030 together define a first variable pressure chamber 1040. The first variable pressure chamber 1040 has a first air hole 1010a formed on the carrier 1010. The first air hole 1010a is able to be connected to a pressure regulating device (not shown). The said pressure regulating device is able to regulate first internal pressure of the first variable pressure chamber 1040 by supplying or extracting air through the first air hole 1010a. The air flowing through the first air hole 1010a is, for example, helium, nitrogen, oxygen or a mixture of gases that surrounds the earth and forms its atmosphere. The carrier 1010 has a plurality of suction holes 1010b. The suction holes 1010b can also be connected to the aforementioned pressure regulating device or another pressure regulating device (not shown). The said pressure regulating device is able to extract air in the first variable pressure chamber 1040 through the suction holes 1010b, thereby pressure difference between the first variable pressure chamber 1040 and the suction holes 1010b. Thus, the first internal pressure of the first variable pressure chamber 1040 is greater than internal pressure of the suction holes 1010b so that the first substrate 91 is able to be fixed on the carrier 1010.

The height adjusting mechanism 1050 is able to adjust the distance d4 between the flexible member 1030 and the carrier 1010 so as to adjust the volume of the first variable pressure chamber 1040 according to the height of the laminated substrates. As shown in FIG. 13A, the device 1000 accommodates the first substrate 91, the second substrate 92 and a third substrate 93 which are a three-layer laminated structure. In this embodiment, each of the first substrate 91 and the third substrate 93 is, for example, a glass substrate (layer). The second substrate 92 is, for example, a flexible substrate (layer). The first substrate 91 is attached to the carrier 1010, and the third substrate 93 is attached to the flexible member 1030.

As shown in FIG. 13B, the distance d4 between the flexible member 1030 and the carrier 1010 is adjusted to be less than the one of FIG. 13A in order to match the height of the two-layer laminated structure (the first substrate 93 and the second substrate 92). Accordingly, by the height adjusting mechanism 1050, the device 1000 is able to perform removing process according to different heights of the laminated substrates.

In addition, in this embodiment, the device 1000 further includes a ring-shaped seal 1060 disposed between the bottom parts 1023 and the carrier 1010. The ring-shaped seal 1060 is, for example, made of a flexible or elastic material such as rubber, but the disclosure is not limited thereto. The ring-shaped seal 1060 is normally pressed between the bottom parts 1023 and the carrier 1010. Thus, during the removing process, air in the first variable pressure chamber 1040 is prevented from leaking from the gap between the carrier 1010 and the supporting member 1020. During the adhering process, air from the environment would not enter the first variable pressure chamber 1040 from the gap between the carrier 1010 and the supporting member 1020.

Figure 14:
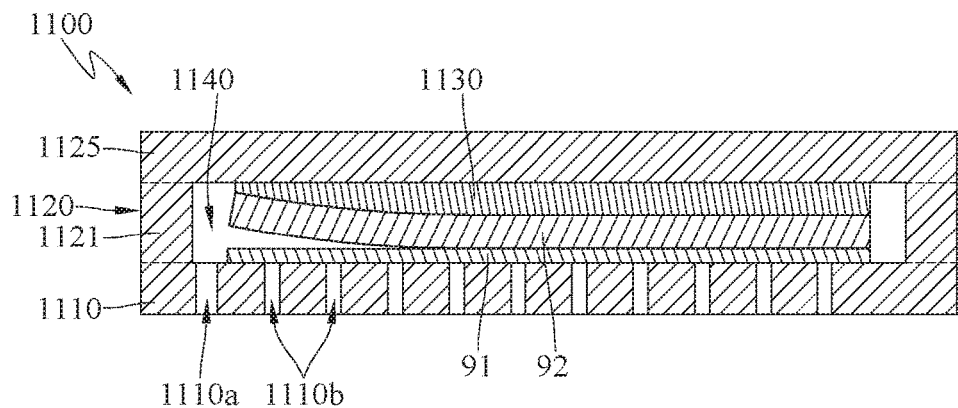
FIG. 14 is a conceptual view showing a process for removing the second substrate from the first substrate by using a device for removing and adhering substrate according to an eleventh embodiment of the present disclosure.

Then, please refer to FIG. 14, which is a conceptual view showing a process for removing the second substrate from the first substrate by using a device for removing and adhering substrate according to an eleventh embodiment of the present disclosure. It is noted that the device can remove the second substrate from the first substrate or adhere the second substrate to the first substrate. As shown in FIG. 14, a device 1100 is provided. The device 1100 is similar to the device 300 of the third embodiment.

In this embodiment, the device 1100 includes a carrier 1110, a supporting member 1120 and a flexible member 1130. The supporting member 1120 includes a plurality of side walls 1121 and a cover 1125. The side walls 1121 are connected to and surrounded on the carrier 1110. The cover 1125 is disposed on a side of the side walls 1121 which is opposite to the carrier 1110. That is, the side walls 1121 are between the cover 1125 and the carrier 110. The flexible member 1130 is disposed between the cover 1125 and the carrier 1110. The flexible member 1130 is, for example, made of a flexible or elastic material such as rubber or silicon, but the disclosure is not limited thereto.

The carrier 1110, the supporting member 1120 and the flexible member 1130 together define a first variable pressure chamber 1140. The first variable pressure chamber 1140 has a first air hole 1110a formed on the carrier 1110. The first air hole 1110a is able to be connected to a pressure regulating device (not shown). The said pressure regulating device is able to regulate first internal pressure of the first variable pressure chamber 1140 by supplying or extracting air through the first air hole 1110a. The air flowing through the first air hole 1110a is, for example, helium, nitrogen, oxygen or a mixture of gases that surrounds the earth and forms its atmosphere. The carrier 1110 has a plurality of suction holes 1110b. The suction holes 1110b can also be connected to the aforementioned pressure regulating device or another pressure regulating device (not shown). The said pressure regulating device is able to extract air in the first variable pressure chamber 1140 through the suction holes 1110b, thereby pressure difference between the first variable pressure chamber 1140 and the suction holes 1110b. Thus, the first internal pressure of the first variable pressure chamber 1140 is greater than internal pressure of the suction holes 1110b so that the first substrate 91 is able to be fixed on the carrier 1110. The flexible member 1130 is, for example, made of a flexible or elastic material such as rubber or silicon, but the disclosure is not limited thereto.

In this embodiment, a side of the flexible member 1130 is fixed to the cover 1125. The second substrate 92 is fixed on the opposite side of the flexible member 1130. That is, two opposite sides of the flexible member 1130 are clamped by the cover 1125 and the second substrate 92. Thus, during the process of removing the second substrate 92, the flexible member 1130 is pressed by the curled upwardly second substrate 92. The flexible member 1130 has a deformation limit so that the flexible member 1130 is able to constrain the deformation of the curled upwardly second substrate 92. Thus, the second substrate 92 is prevented from being overly curled, thereby preventing breaking.

Figure 15:
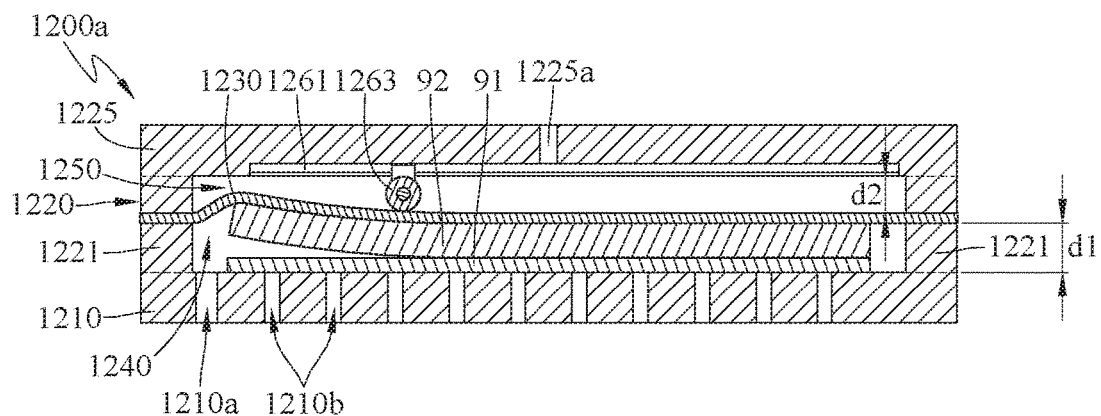
FIG. 15 is a conceptual view showing a process for removing the second substrate from the first substrate by using a device for removing and adhering substrate according to a twelfth embodiment of the present disclosure.

Then, please refer to FIG. 15, which is a conceptual view showing a process for removing the second substrate from the first substrate by using a device for removing and adhering substrate according to a twelfth embodiment of the present disclosure. It is noted that the device can remove the second substrate from the first substrate or adhere the second substrate to the first substrate. As shown in FIG. 15, a device 1200a is provided. The device 1200a is similar to the device 600 of the sixth embodiment.

In this embodiment, the device 1200a includes a carrier 1210, a supporting member 1220 and a flexible member 1230. The supporting member 1220 includes a plurality of side walls 1221 and a cover 1225. The side walls 1221 are connected to and surrounded on the carrier 1210. The cover 1225 is disposed on a side of the side walls 1221 which is opposite to the carrier 1210. That is, the side walls 1221 are between the cover 1225 and the carrier 1210. The flexible member 1230 is fixed between the side walls 1221. The flexible member 1230 and the carrier 1210 are spaced a distance d1 from each other. The flexible member 1230 and the cover 1225 are spaced a distance d2 from each other. The flexible member 1230 is, for example, made of a flexible or elastic material such as rubber or silicon, but the disclosure is not limited thereto.

The carrier 1210, the side walls 1221 of the supporting member 1220 and the flexible member 1230 together define a first variable pressure chamber 1240. The cover 1225 and the flexible member 1230 together define a second variable pressure chamber 1250. The first variable pressure chamber 1240 has a first air hole 1210a formed on the carrier 1210. The second variable pressure chamber 1250 has a second air hole 1225a formed on the cover 1225. The first air hole 1210a and the second air hole 1225a are able to be connected to a pressure regulating device (not shown). The said pressure regulating device is able to regulate first internal pressure of the first variable pressure chamber 1240 and second internal pressure of the second variable pressure chamber 1250 by respectively supplying or extracting air through the first air hole 1210a and the second air hole 1225a. The air flowing through the first air hole 1210a and the second air hole 1225a is, for example, helium, nitrogen, oxygen or a mixture of gases that surrounds the earth and forms its atmosphere. In this embodiment, second air hole 1225a is optional and can be altered according to actual requirement. The carrier 1210 has a plurality of suction holes 1210b. The suction holes 1210b can also be connected to the aforementioned pressure regulating device or another pressure regulating device (not shown). The said pressure regulating device is able to extract air in the first variable pressure chamber 1240 through the suction holes 1210b, thereby creating pressure difference between the first variable pressure chamber 1240 and the suction holes 1210b. Thus, the first internal pressure of the first variable pressure chamber 1240 is greater than internal pressure of the suction holes 1210b so that the first substrate 91 is able to be fixed on the carrier 1210. The second substrate 92 is fixed on the flexible member 1230 by, for example, adhesive (not shown), but the disclosure is not limited thereto.

In this embodiment, the device 1200a further includes a rail member 1261 and a deformation restrictor 1263. The rail member 1261 is fixed to the cover 1225. One end of the deformation restrictor 1263 is equipped with a roller, and the opposite end of the deformation restrictor 1263 is slidably disposed on the rail member 1261. However, the present disclosure is not limited to the configuration of deformation restrictor 1263.

The deformation restrictor 1263 guided by the rail member 1261 is only able to be moved along the rail member 1261 in one direction. Thus, during the process of removing the second substrate 92, the deformation restrictor 1263 is able to constrain the flexible member 1230 to be moved in one direction as well. Hence, the second substrate 92 on the flexible member 1230 is curled in the same manner as well. In addition, during the process of removing the second substrate 92, since the roller on the deformation restrictor 1263 is able to constrain the deformation of the curled upwardly flexible member 1230, the flexible member 1230 is prevent from being overly curled. Thus, the second substrate 92 on the flexible member 1230 is prevented from breaking. Similarly, during the process of adhering the second substrate 92 to the first substrate 91, the rail member 1261 and the deformation restrictor 1263 are able to constrain the second substrate 92 to be adhered to the first substrate 91 in one direction.

Figure 16A:
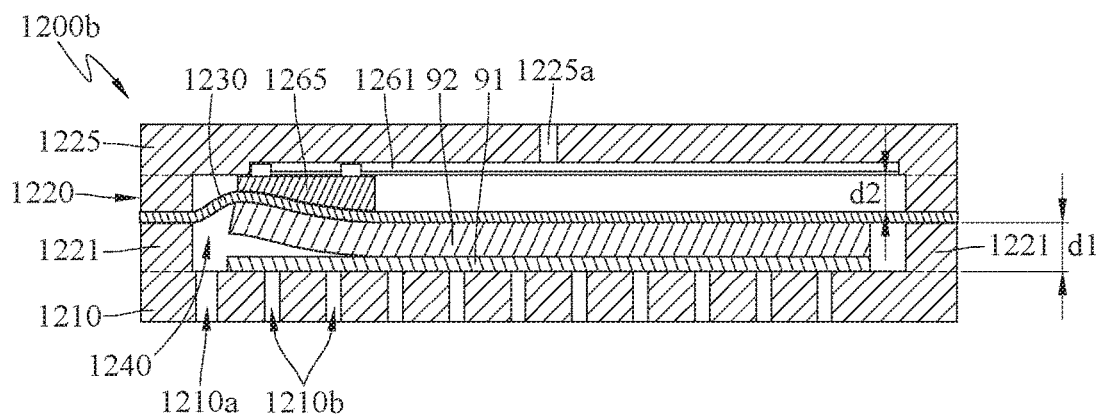
FIG. 16A is a conceptual view showing a process for removing the second substrate from the first substrate by using a device for removing and adhering substrate according to a thirteenth embodiment of the present disclosure.
Figure 16B:
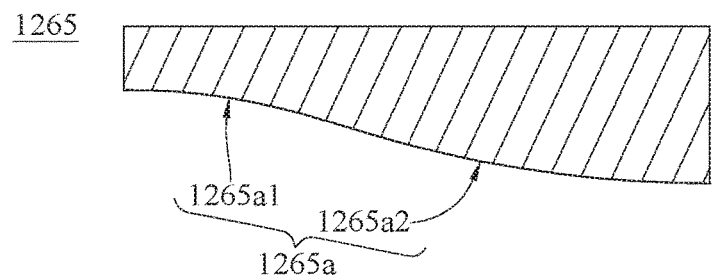
FIG. 16B is an enlarged view of a deformation restrictor in FIG. 16A.

Then please refer to FIGS. 16A-16B, FIG. 16A is a conceptual view showing a process for removing the second substrate from the first substrate by using a device for removing and adhering substrate according to a thirteenth embodiment of the present disclosure. It is noted that the device can remove the second substrate from the first substrate or adhere the second substrate to the first substrate. FIG. 16B is an enlarged view of a deformation restrictor in FIG. 16A. As shown in FIG. 16A, a device 1200b is provided. The device 1200b is similar to the device 1200a in the twelfth embodiment, thus only the differences therebetween are described herein.

In this embodiment, the device 1200b includes a deformation restrictor 1265. In this embodiment, the deformation restrictor 1265 is a block having a contact surface 1265a. The contact surface 1265a has a concave section 1265a1 and a convex section 1265a2 which are connected to each other. The convex section 1265a2 is more close to the carrier 1210 than the concave section 1265a1. During the process of removing the second substrate 92, the curled upwardly flexible member 1230 can match the shape of the contact surface 1265a, thereby constraining the deformation of the flexible member 1230. Hence, the deformation of the second substrate 92 on the flexible member 1230 is able to be maintained in a desired range.

Figure 17A:
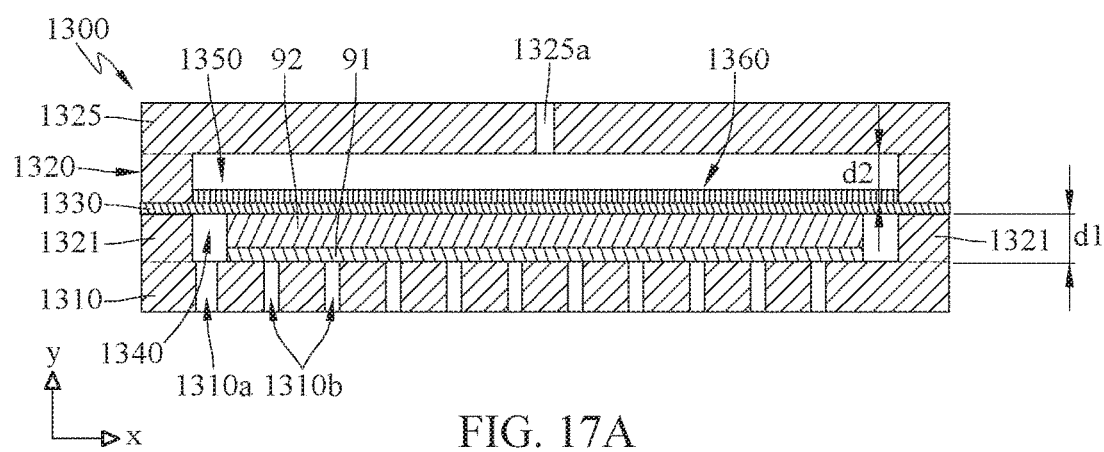
FIG. 17A is a cross-sectional view of a device for removing and adhering substrate before removing the second substrate from the first substrate according to a fourteenth embodiment of the present disclosure.
Figure 17B:
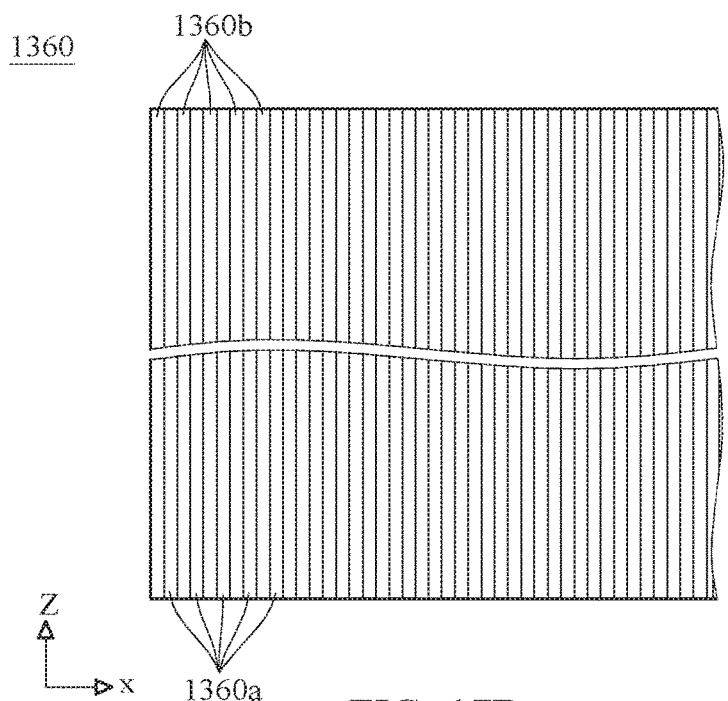
FIG. 17B is a top view of a deformation restrictor in FIG. 17A.
Figure 17C:
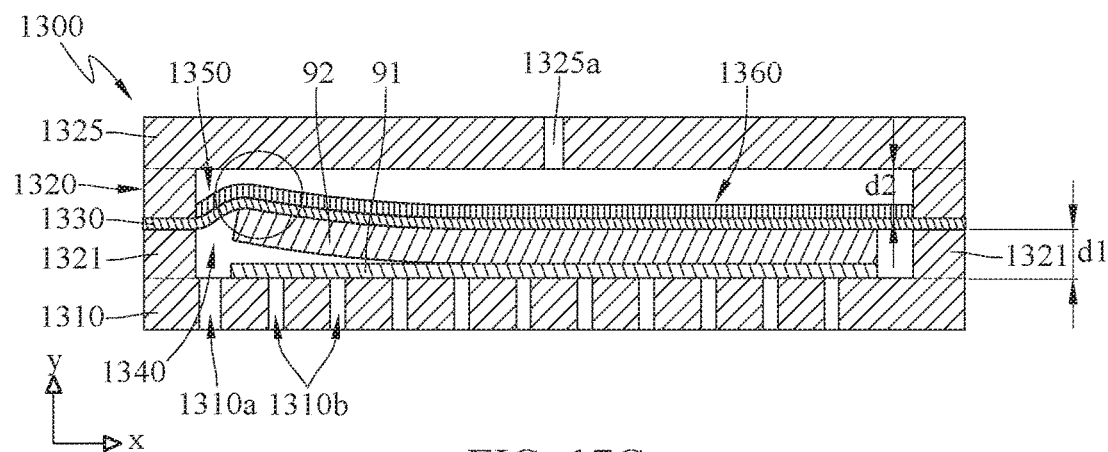
FIG. 17C is a conceptual view showing a process for using the device according to the fourteenth embodiment of the present disclosure.
Figure 17D:
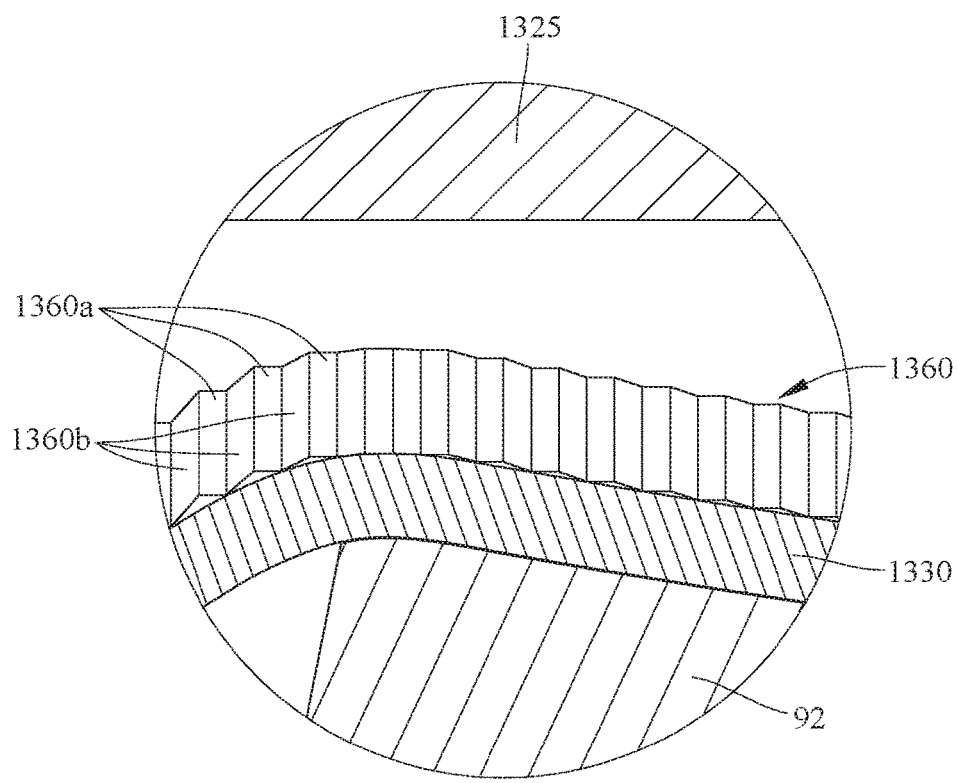
FIG. 17D is a partial enlarged view of the device in FIG. 17C.

Please refer to FIG. 17A-17D, FIG. 17A is a cross-sectional view of a device for removing and adhering substrate before removing the second substrate from the first substrate according to a fourteenth embodiment of the present disclosure, for instance, the device can remove a second substrate from a first substrate or adhere the second substrate to the first substrate. FIG. 17B is a top view of a deformation restrictor in FIG. 17A, FIG. 17C is a conceptual view showing a process for using the device according to the fourteenth embodiment of the present disclosure, and FIG. 17D is a partial enlarged view of the device in FIG. 17C. As shown in FIG. 17A, a device 1300 is provided. The device 1300 is similar to the device 600 of the sixth embodiment.

In this embodiment, the device 1300 includes a carrier 1310, a supporting member 1320 and a flexible member 1330. The supporting member 1320 includes a plurality of side walls 1321 and a cover 1325. The side walls 1321 are connected to and surrounded on the carrier 1310. The cover 1325 is disposed on a side of the side walls 1321 which is opposite to the carrier 1310. That is, the side walls 1321 are between the cover 1325 and the carrier 1310. The flexible member 1330 is fixed between the side walls 1321. The flexible member 1330 and the carrier 1310 are spaced a distance d1 from each other. The flexible member 1330 and the cover 1325 are spaced a distance d2 from each other. However, the cover 1325 is optional and can be altered according to actual requirement. The flexible member 1330 is, for example, made of a flexible or elastic material such as rubber or silicon, but the disclosure is not limited thereto.

The carrier 1310, the side walls 1321 of the supporting member 1320 and the flexible member 1330 together define a first variable pressure chamber 1340. The cover 1325 and the flexible member 1330 together define a second variable pressure chamber 1350. The first variable pressure chamber 1340 has a first air hole 1310a formed on the carrier 1310. The second variable pressure chamber 1350 has a second air hole 1325a formed on the cover 1325. The first air hole 1310a and the second air hole 1325a are able to be connected to a pressure regulating device (not shown). The said pressure regulating device is able to regulate first internal pressure of the first variable pressure chamber 1340 and second internal pressure of the second variable pressure chamber 1350 by respectively supplying or extracting air through the first air hole 1310a and the second air hole 1325a. The air flowing through the first air hole 1310a and the second air hole 1325a is, for example, helium, nitrogen, oxygen or a mixture of gases that surrounds the earth and forms its atmosphere. However, the second air hole 1325a is optional and can be altered according to actual requirement. The carrier 1310 has a plurality of suction holes 1310b. The suction holes 1310b can also be connected to the aforementioned pressure regulating device or another pressure regulating device (not shown). The said pressure regulating device is able to extract air in the first variable pressure chamber 1340 through the suction holes 1310b, thereby creating pressure difference between the first variable pressure chamber 1340 and the suction holes 1310b. Thus, the first internal pressure of the first variable pressure chamber 1340 is greater than internal pressure of the suction holes 1310b so that the first substrate 91 is able to be fixed on the carrier 1310. The first substrate 91 is between the second substrate 92 and the carrier 1310. The second substrate 92 is fixed on the flexible member 1330 by, for example, adhesive (not shown), but the disclosure is not limited thereto.

In this embodiment, the device 1300 further includes a deformation restrictor 1360 disposed on the flexible member 1330. In detail, as shown in FIG. 17B, the deformation restrictor 1360 includes a plurality of hard parts 1360a and a plurality of soft parts 1360b. The hard parts 1360a and the soft parts 1360b are staggered with respect to each other. An extension direction of each of the hard parts 1360a and an extension direction of each of the soft parts 1360b are both parallel to Z-axis direction. In this embodiment, the hard parts 1360a are, for example, made of rigid or inflexible materials, and the soft parts 1360b is for example, made of a flexible or elastic material. Thus, the deformation restrictor 1360 is only able to be curled in the same direction (e.g. Z-axis direction). As shown in FIGS. 17C-17D, during the adhering or removing process, the flexible member 1330 constrained by the deformation restrictor 1360 is only able to be curled in one direction. Thus, the second substrate 92 fixed to the flexible member 1330 is curled in one direction as well. Hence, the second substrate 92 can not be curled in multi-direction and therefore result in undesired stress during the removing process.

Figure 18A:
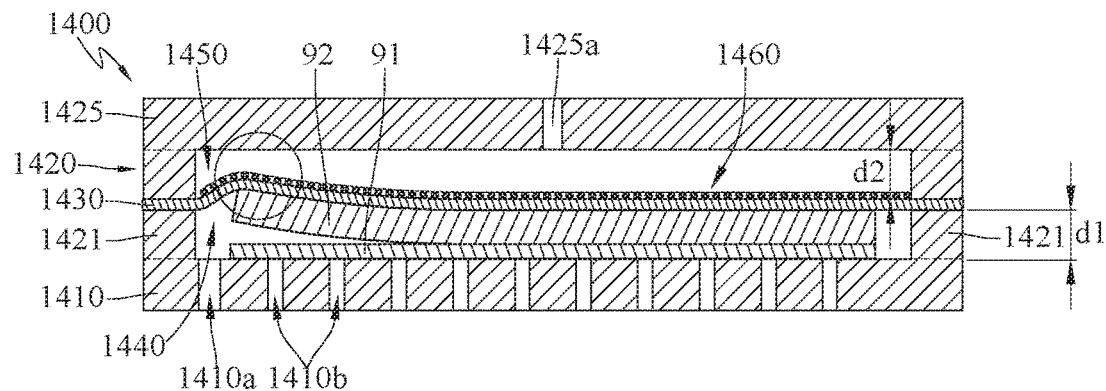
FIG. 18A is a conceptual view showing a process for removing the second substrate from the first substrate by using a device for removing and adhering substrate according to the fifteenth embodiment of the present disclosure.
Figure 18B:
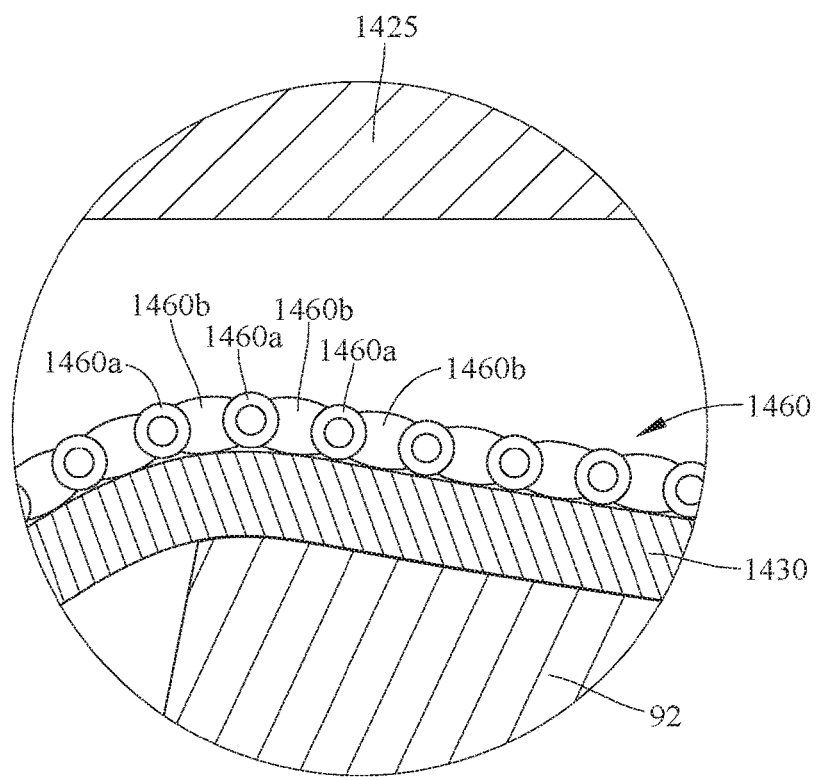
FIG. 18B is an enlarged view of the device of FIG. 18A.

However, the present disclosure is not limited to the deformation restrictor 1360. For example, please see FIGS. 18A-18B, FIG. 18A is a conceptual view showing a process for removing the second substrate from the first substrate by using a device for removing and adhering substrate according to the fifteenth embodiment of the present disclosure. It is noted that the device can remove the second substrate from the first substrate or adhere the second substrate to the first substrate. FIG. 18B is an enlarged view of the device of FIG. 18A. As shown in FIG. 18A, a device 1400 is provided. The device 1400 is similar to the device 1300 in the fourteenth embodiment. The differences between the two embodiments are that the device 1400 includes a deformation restrictor 1460 including a plurality of shafts 1460a and a plurality of connecting parts 1460b which are staggered, and each of the shafts 1460a is pivoted between two of the connecting parts 1460b.

Figure 19:
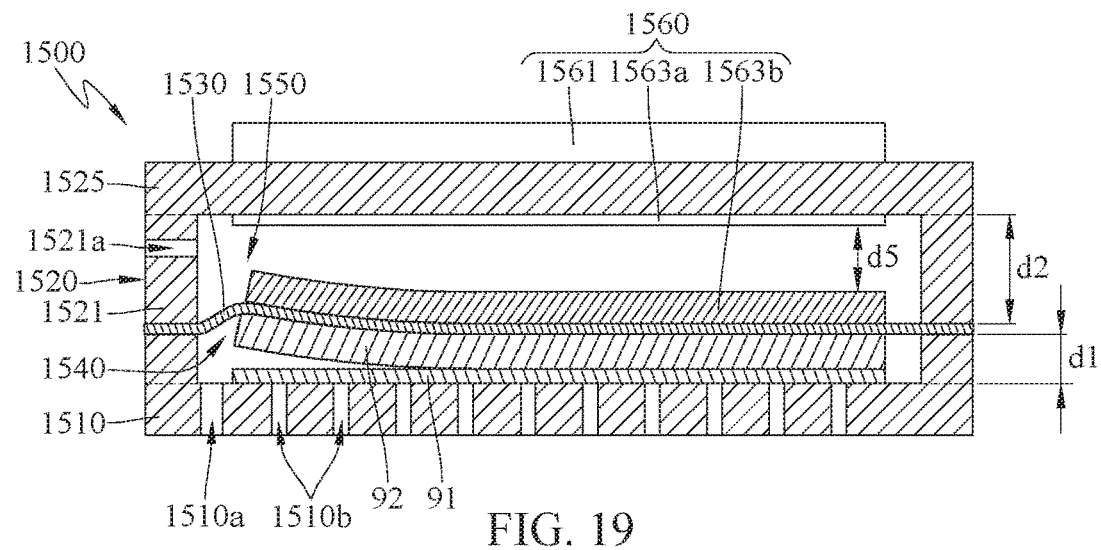
FIG. 19 is a conceptual view showing a process for removing the second substrate from the first substrate by using a device for removing and adhering substrate according to a sixteenth embodiment of the present disclosure.

Then, please refer to FIG. 19, which is a conceptual view showing a process for removing the second substrate from the first substrate by using a device for removing and adhering substrate according to a sixteenth embodiment of the present disclosure. It is noted that the device can remove the second substrate from the first substrate or adhere the second substrate to the first substrate. As shown in FIG. 19, a device 1500 is provided. The device 1500 is similar to the device 600 of the sixth embodiment.

In this embodiment, the device 1500 includes a carrier 1510, a supporting member 1520 and a flexible member 1530. The supporting member 1520 includes a plurality of side walls 1521 and a cover 1525. The side walls 1521 are connected to and surrounded on the carrier 1510. The cover 1525 is disposed on a side of the side walls 1521 which is opposite to the carrier 1510. That is, the side walls 1521 are between the cover 1525 and the carrier 1510. The flexible member 1530 is fixed between the side walls 1521. The flexible member 1530 and the carrier 1510 are spaced a distance d1 from each other. The flexible member 1530 and the cover 1525 are spaced a distance d2 from each other. The flexible member 1530 is, for example, made of a flexible or elastic material such as rubber or silicon, but the disclosure is not limited thereto.

The carrier 1510, the side walls 1521 of the supporting member 1520 and the flexible member 1530 together define a first variable pressure chamber 1540. The cover 1525 and the flexible member 1530 together define a second variable pressure chamber 1550. The first variable pressure chamber 1540 has a first air hole 1510a formed on the carrier 1510. The second variable pressure chamber 1550 has a second air hole 1521a formed on one of the side wall 1521. The first air hole 1510a and the second air hole 1521a both are able to be connected to a pressure regulating device (not shown). The said pressure regulating device is able to regulate first internal pressure of the first variable pressure chamber 1540 and second internal pressure of the second variable pressure chamber 1550 by respectively supplying or extracting air through the first air hole 1510a and the second air hole 1521a. The air flowing through the first air hole 1510a and the second air hole 1521a is, for example, helium, nitrogen, oxygen or a mixture of gases that surrounds the earth and forms its atmosphere. The carrier 1510 has a plurality of suction holes 1510b. The suction holes 1510b can also be connected to the aforementioned pressure regulating device or another pressure regulating device (not shown). The said pressure regulating device is able to extract air in the first variable pressure chamber 1540 through the suction holes 1510b, thereby creating pressure difference between the first variable pressure chamber 1540 and the suction holes 1510b. Thus, the first internal pressure of the first variable pressure chamber 1540 is greater than internal pressure of the suction holes 1510b so that the first substrate 91 is able to be fixed on the carrier 1510. The first substrate 91 is between the second substrate 92 and the carrier 1510. The second substrate 92 is fixed on the flexible member 1530 by, for example, adhesive (not shown), but the disclosure is not limited thereto.

In this embodiment, the device 1500 further includes a distance detecting module 1560. The distance detecting module 1560 includes a distance detector 1561 and two flexible conductive plates 1563a and 1563b. The distance detector 1561 is disposed on the cover 1525. The flexible conductive plates 1563a and 1563b are disposed in the first variable pressure chamber 1540. The flexible conductive plate 1563a is disposed on the cover 1525. The flexible conductive plate 1563b is disposed on the flexible member 1530. The distance detector 1561 is adapted for detecting a capacitance variation and then calculating a displacement between the flexible conductive plates 1563a and 1563b. In detail, during the removing or adhering process, the flexible conductive plate 1563b on the flexible member 1530 will be deformed with the flexure (deformation) of the flexible member 1530, a distance d5 between the flexible conductive plates 1563a and 1563b will be changed due to the flexure of the flexible member 1530, thereby changing the capacitance between the flexible conductive plates 1563a and 1563b. The distance detector 1561 is able to calculate the value of distance d5 by detecting the change of the capacitance, which is favorable for detecting the removing or adhering process.

Figure 20A:
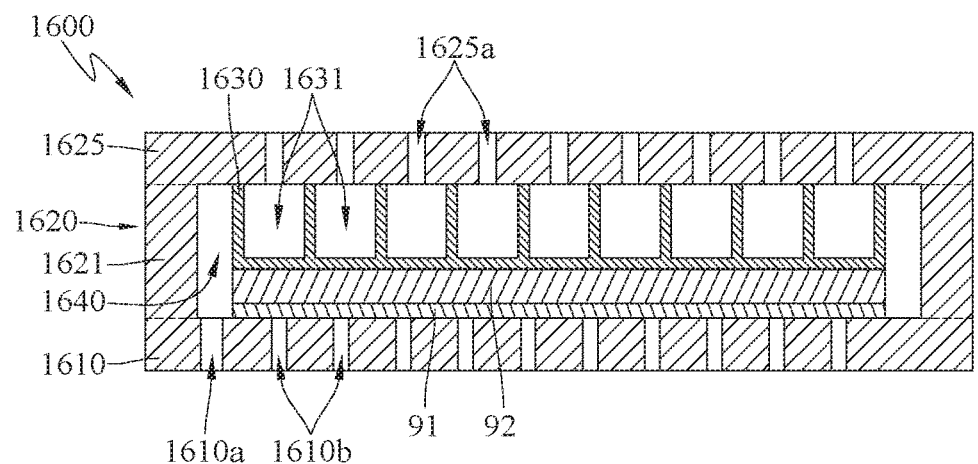
FIG. 20A is a cross-sectional view of a device for removing and adhering substrate before removing the second substrate from the first according to a seventeenth embodiment of the present disclosure.
Figure 20B:
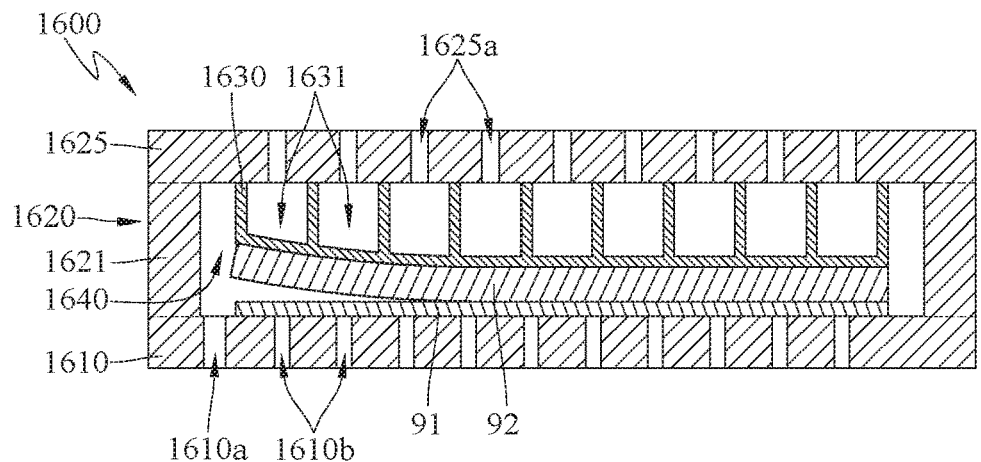
FIG. 20B is a conceptual view showing a process for removing the second substrate from the first substrate by using the device according to the seventeenth embodiment of the present disclosure.

Then, please refer to FIGS. 20A-20B, FIG. 20A is a cross-sectional view of a device for removing and adhering substrate before removing the second substrate from the first substrate according to a seventeenth embodiment of the present disclosure, and FIG. 20B is a conceptual view showing a process for removing the second substrate from the first substrate by using the device according to the seventeenth embodiment of the present disclosure. It is noted that the device can remove the second substrate from the first substrate or adhere the second substrate to the first substrate. As shown in FIG. 20A, a device 1600 is provided. The device 1600 is similar to the device 1100 of the eleventh embodiment.

In this embodiment, the device 1600 includes a carrier 1610, a supporting member 1620 and a flexible member 1630. The supporting member 1620 includes a plurality of side walls 1621 and a cover 1625. The side wallls 1621 are connected to and surrounded on the carrier 1610. The cover 1625 is disposed on a side of the side walls 1621 which is opposite to the carrier 1610. That is, the side walls 1621 are between the cover 1625 and the carrier 1610. The flexible member 1630 is disposed on the cover 1625, and is between the cover 1625 and the carrier 1610. The flexible member 1630 is, for example, made of a flexible or elastic material such as rubber or silicon, but the disclosure is not limited thereto.

The carrier 1610, the supporting member 1620 and the flexible member 1630 together define a first variable pressure chamber 1640. The first variable pressure chamber 1640 has a first air hole 1610a formed on the carrier 1610. The first air hole 1610a is able to be connected to a pressure regulating device (not shown). The said pressure regulating device is able to regulate first internal pressure of the first variable pressure chamber 1640 by supplying or extracting air through the first air hole 1610a. The air flowing through the first air hole 1610a is, for example, helium, nitrogen, oxygen or a mixture of gases that surrounds the earth and forms its atmosphere. The carrier 1610 has a plurality of suction holes 1610b. The suction holes 1610b can also be connected to the aforementioned pressure regulating device or another pressure regulating device (not shown). The said pressure regulating device is able to extract air in the first variable pressure chamber 1640 through the suction holes 1610b, thereby creating pressure difference between the first variable pressure chamber 1640 and the suction holes 1610b. Thus, the first internal pressure of the first variable pressure chamber 1640 is greater than internal pressure of the suction holes 1610b so that the first substrate 91 is able to be fixed on the carrier 1610. The first substrate 91 is between the second substrate 92 and the carrier 1610. The second substrate 92 is fixed on the flexible member 1630 by, for example, adhesive (not shown), but the disclosure is not limited thereto.

In this embodiment, the flexible member 1630 has a plurality of compartments 1631. The cover 1625 further has a plurality of second air holes 1625a. The second air holes 1625a are corresponding to the compartments 1631, respectively. In detail, the second air holes 1625a are able to be connected to the aforementioned pressure regulating device or another pressure regulating device (not shown). The said pressure regulating device can supply or extract air through the second air holes 1625a so as to respectively regulate internal pressure P3 in the compartments 1631.

As shown in FIG. 20B, during the removing or adhering process, the pressure regulating device can sequentially supply or extract air through second air holes 1625a so as to sequentially regulate the internal pressure P3 in the compartments 1631. Therefore, the deformation of the flexible member 1630 can be controlled more precisely, which helps the removing process or the adhering process to perform.

In the aforementioned embodiments, according to the device for removing and adhering substrate and the process for using the device as discussed above, the differential pressure is produced between two sides of the flexible member by regulating the internal pressure in the first variable pressure chamber, thus the flexible member and the substrate thereon can be curled together to perform the removing or adhering process.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A device for removing a first substrate from a second substrate or adhering the first substrate to the second substrate, the device comprising:
    a carrier having a plurality of suction holes for sucking the first substrate, wherein the plurality of suction holes are configured to be located within an orthogonal projection of the first substrate onto the carrier;
    a flexible member for fixing the second substrate; and
    a supporting member comprising a plurality of side walls and a cover, wherein the plurality of side walls is connected to and disposed between the cover and the carrier, the flexible member is fixed to the plurality of side walls and is spaced apart from the carrier and the cover, and the carrier further has a first air hole, which is directly connected to a first variable pressure chamber defined by an area enclosed between the carrier, the flexible member, the plurality of side walls of the supporting member, and at least one of the first and second substrate.

2. The device according to claim 1, further comprising at least one remove trigger configured to separate a part of the first substrate from the second substrate.

3. The device according to claim 2, wherein the at least one remove trigger comprises a sucking disk and a linkage, the linkage is connected to the supporting member, and the sucking disk is movably disposed on the linkage.

4. The device according to claim 1, wherein the cover has at least one second air hole, and the cover and the flexible member together define a second variable pressure chamber.

5. The device according to claim 1, further comprising a deformation restrictor and a rail member, the rail member fixed to the cover, the deformation restrictor slidably disposed on the rail member.

6. The device according to claim 1, further comprising a distance detecting module configured to detect a change in the distance between the cover and the flexible member.

7. The device according to claim 1, further comprising a plurality of sucking disks fixed to the cover and disposed between the cover and the flexible member, the cover has a plurality of second air holes corresponding to the plurality of sucking disks, and a length of one of the plurality of sucking disks is changed by changing internal pressure therein.

8. The device according to claim 1, further comprising at least one height adjusting mechanism connected between the supporting member and the carrier configured to adjust the distance between the carrier and the flexible member.

9. The device according to claim 1, wherein the supporting member comprises a plurality of side walls and a cover, the plurality of side walls is disposed between the cover and the carrier, the flexible member is disposed between the cover and the carrier, the cover and the second substrate are respectively fixed to two sides of the flexible member that are opposite to each other.

10. The device according to claim 9, wherein the flexible member has a plurality of compartments, the cover has a plurality of second air holes, and the plurality of second air holes are corresponded to the plurality of compartments, respectively.

11. The device according to claim 1, further comprising a deformation restrictor, the deformation restrictor comprising a plurality of hard parts and a plurality of soft parts, the plurality of hard parts and the plurality of soft parts staggered with respect to each other, the deformation restrictor fixed on the flexible member for constraining the flexible member to be curled in a direction.

12. The device according to claim 1, further comprising a deformation restrictor, the deformation restrictor comprising a plurality of shafts and a plurality of connecting parts, the plurality of shafts and the plurality of connecting parts staggered with respect to each other, each of the plurality of shafts pivoted between two of the plurality of connecting parts, the deformation restrictor fixed on the flexible member for constraining the flexible member to be curled in a direction.

13. The device according to claim 1, wherein the first air hole and the plurality of suction holes are arranged in an extension direction of the carrier.

14. The device according to claim 1, wherein the first air hole is not covered by the first substrate.

* * * * *